United States Patent
Kuchiki

(10) Patent No.: US 9,467,672 B2
(45) Date of Patent: Oct. 11, 2016

(54) IMAGE PROCESSING DEVICE THAT PERFORMS WHITE BALANCE CONTROL, METHOD OF CONTROLLING THE SAME, AND IMAGE PICKUP APPARATUS

(71) Applicant: CANON KABUSHIKI KAISHA, Tokyo (JP)

(72) Inventor: Hiroaki Kuchiki, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/790,652

(22) Filed: Jul. 2, 2015

(65) Prior Publication Data
US 2016/0007001 A1     Jan. 7, 2016

(30) Foreign Application Priority Data
Jul. 7, 2014 (JP) .................... 2014-139610

(51) Int. Cl.
H04N 9/73 (2006.01)
H04N 5/235 (2006.01)
H04N 1/60 (2006.01)

(52) U.S. Cl.
CPC .......... *H04N 9/735* (2013.01); *H04N 1/6077* (2013.01); *H04N 5/2354* (2013.01)

(58) Field of Classification Search
CPC .. H04N 9/735; H04N 1/6077; H04N 5/2354; H04N 9/3182; H04N 9/73; G09G 3/2003; G09G 3/3607

USPC ............ 348/223.1–229.1; 396/225; 345/549
See application file for complete search history.

(56) References Cited

U.S. PATENT DOCUMENTS

| 4,723,170 A | * | 2/1988 | Jaspers | .................. H04N 5/361 348/222.1 |
| 2012/0188402 A1 | * | 7/2012 | Guo | ..................... H04N 5/2351 348/223.1 |

FOREIGN PATENT DOCUMENTS

| JP | 2003-163944 A | 6/2003 |
| JP | 2006-174281 A | 6/2006 |

* cited by examiner

Primary Examiner — Yogesh Aggarwal
(74) Attorney, Agent, or Firm — Cowan, Liebowitz & Latman, P.C.

(57) ABSTRACT

An image processing device capable of stably performing white balance control. A first WB correction value is calculated according to an infrared light amount obtained from a first image. A second WB correction value different from the first one is calculated according to white pixels obtained from the first image. A third WB correction value is calculated based on the first and second WB correction values. White balance processing is performed on the first image using the third WB correction value, which is stored as a reference WB correction value. When the infrared light amount not smaller than a predetermined amount is obtained from the second image and also the number of obtained white pixels is smaller than a predetermined number, white balance processing is performed on the second image using the stored reference WB correction value.

12 Claims, 16 Drawing Sheets

IMAGE PROCESSING DEVICE THAT PERFORMS WHITE BALANCE CONTROL, METHOD OF CONTROLLING THE SAME, AND IMAGE PICKUP APPARATUS

BACKGROUND OF THE INVENTION

1. Field of the Invention

The present invention relates to an image processing device that performs white balance control, a method of controlling the same, and an image pickup apparatus, and more particularly to white balance processing performed by the image processing device.

2. Description of the Related Art

In recent years, in automatic white balance processing performed by an image processing device, such as an image pickup apparatus, a so-called TTL (Through The Lens) method is widely used. In automatic white balance processing using the TTL method, the color of light from a light source is estimated according to an image obtained by photographing. Further, to calculate a white balance correction value (hereinafter referred to as a WB correction value), it is necessary to accurately distinguish, on the image, between the color of light from the light source and the color of the object.

For example, there has been proposed an image pickup apparatus that divides an image into a plurality of areas (block areas), and applies color information obtained from each divided area to detection frames each indicative of a range of color distribution corresponding to the light source type (see Japanese Patent Laid-Open Publication No. 2003-163944). In this image pickup apparatus, the light source is determined, on a detection frame-by-detection frame basis, according to the number of applicable areas, the luminance level of an object, and an infrared light amount, and white balance control is performed based on the result of the determination.

Further, there has been proposed an image pickup apparatus that is configured to perform proper white balance control with respect to a green object included in a white extraction range, on which an action for converting green to an achromatic color works (e.g. in a case where green trees or grasses are photographed in a dark place, such as a place in the shade) (see Japanese Patent Laid-Open Publication No. 2006-174281). In this image pickup apparatus, white balance is controlled by determining, based on distribution of data on a three-dimensional coordinate system having an illuminance, an amount of green, and an R gain, as coordinate axes, whether an image has been photographed indoors using indoor fluorescent lamps as a light source, or has been photographed outdoors in the sun/shade.

However, in the image pickup apparatuses described in Japanese Patent Laid-Open Publication No. 2003-163944 and Japanese Patent Laid-Open Publication No. 2006-174281, even under the light from the same light source, if the color of an object in an image changes, it is difficult to perform white balance control using the same WB correction value.

For example, the image pickup apparatus described in Japanese Patent Laid-Open Publication No. 2003-163944 considers using an intermediate value of the WB correction values associated with the respective light sources, by changing a gain value according to an evaluation value of each light source. However, in Japanese Patent Laid-Open Publication No. 2003-163944, since the light source is detected based on the color distribution, if the color of an object in the image changes, it is difficult to stably continue application of the WB correction value.

Further, the image pickup apparatus described in Japanese Patent Laid-Open Publication No. 2006-174281 considers stepwise changing the white balance control according to a distance from a light source identification boundary on a three-dimensional coordinate plane. However, also in Japanese Patent Laid-Open Publication No. 2006-174281, if the color of an object changes, it is difficult to stably continue application of the WB correction value, similarly to the image pickup apparatus described in Japanese Patent Laid-Open Publication No. 2003-163944.

SUMMARY OF THE INVENTION

The present invention provides an image processing device that is capable of stably performing white balance control in a manner less liable to be influenced by a change in the color of an object, a method of controlling the same, and an image pickup apparatus.

In a first aspect of the present invention, there is provided an image processing device that performs white balance processing, comprising a first calculation unit configured to calculate a first white balance correction value for performing white balance processing, according to an amount of infrared light obtained from a first image, a second calculation unit configured to calculate a second white balance correction value which is different from the first white balance correction value, according to white pixels obtained from the first image, a third calculation unit configured to calculate a third white balance correction value based on the first white balance correction value and the second white balance correction value, a white balance control unit configured to perform white balance processing on the first image using the third white balance correction value, and a storage unit configured to store the third white balance correction value as a reference white balance correction value, wherein when performing white balance processing on a second image which is obtained through photographing performed later than photographing the first image, the white balance control unit performs, in a case where an amount of infrared light not smaller than a predetermined amount is obtained from the second image, and also the number of obtained white pixels in the second image is smaller than a predetermined number, white balance processing on the second image using the reference white balance correction value stored in the storage unit.

In a second aspect of the present invention, there is provided an image pickup apparatus comprising an image pickup device, an infrared light sensor that detects infrared light, an acquisition unit configured to acquire a color evaluation value from a first image obtained through photographing performed using the image pickup device, a calculation unit configured to calculate a white balance correction value using a result of detection of an amount of infrared light when photographing the first image and the color evaluation value acquired from the first image, an image processing unit configured to perform white balance correction processing on the first image using the white balance correction value, and a storage unit configured to store the white balance correction value used for the white balance correction processing, wherein when performing white balance processing on a second image which is obtained through photographing performed later than photographing the first image, the image processing unit determines, using the result of detection of the amount of infrared light when photographing the second image, whether or not to take over the reference white balance correction value stored in the storage unit, and then performs white balance processing on the second image.

In a third aspect of the present invention, there is provided a method of controlling an image processing device that performs white balance processing and includes a storage unit, comprising calculating a first white balance correction value for performing white balance processing, according to an amount of infrared light obtained from a first image, calculating a second white balance correction value which is different from the first white balance correction value, according to white pixels obtained from the first image, calculating a third white balance correction value based on the first white balance correction value and the second white balance correction value, performing white balance processing on the first image using the third white balance correction value, storing the third white balance correction value in the storage unit as a reference white balance correction value, and when performing white balance processing on a second image which is obtained through photographing performed later than photographing the first image, performing, in a case where an amount of infrared light not smaller than a predetermined amount is obtained from the second image, and also the number of obtained white pixels in the second image is smaller than a predetermined number, white balance processing on the second image using the reference white balance correction value stored in the storage unit.

According to the present invention, it is possible to cause the image processing device to stably perform white balance control that is less liable to be influenced by a change in the color of an object.

Further features of the present invention will become apparent from the following description of exemplary embodiments (with reference to the attached drawings).

BRIEF DESCRIPTION OF THE DRAWINGS

FIGS. 7A to 7H are diagrams useful in explaining tables used for calculation of a reliability, performed by the white balance controller appearing in FIG. 2, in which FIG. 7A shows a table for use in calculating a ratio-based reliability, FIG. 7B shows a table for use in calculating a distance-based reliability, FIG. 7C shows a table for use in calculating a color reliability, FIG. 7D shows a table for use in calculating a luminance-based reliability, FIG. 7E shows an example of a table for use in calculating an infrared light-based reliability, FIG. 7F shows another example of the table for use in calculating the infrared light-based reliability, FIG. 7G shows a table for use in calculating a green reliability, and FIG. 7H shows a table for use in calculating an evening scene color reliability.

FIGS. 8A and 8B are diagrams useful in explaining infrared light determination-based green detection performed in a step of the WB correction value calculation process in FIG. 4, in which FIG. 8A shows an example of an image represented by RAW data, and FIG. 8B shows a state in which the image shown in FIG. 8A is divided into a predetermined number of blocks.

FIGS. 10A to 10D are diagrams useful in explaining calculation of the WB correction value, performed by the white balance controller appearing in FIG. 2, in which FIG. 10A is a diagram useful in explaining green detection based on infrared light determination, FIG. 10B is a diagram useful in explaining color temperature estimation based on green detection, FIG. 10C is a diagram useful in explaining WB correction value calculation based on color temperature estimation, and FIG. 10D is a diagram useful in explaining calculation of a final WB correction value based on the white-based WB correction value and an infrared light-based WB correction value.

DESCRIPTION OF THE EMBODIMENTS

The present invention will now be described in detail below with reference to the accompanying drawings showing embodiments thereof.

Figure 1:
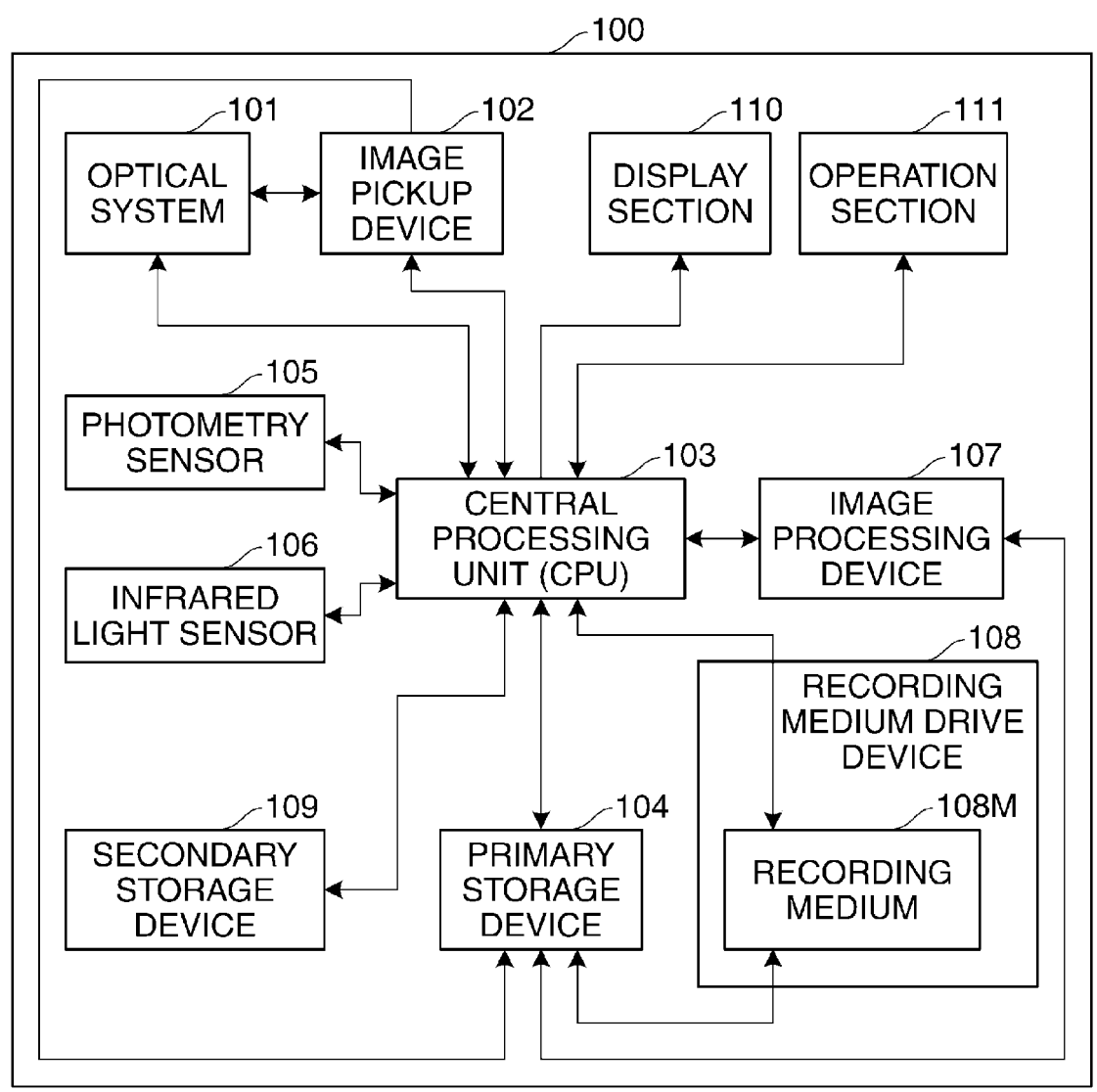
FIG. 1 is a block diagram of a digital camera as an image pickup apparatus including an image processing device according to a first embodiment of the present invention.

FIG. 1 is a block diagram of an image pickup apparatus including an image processing device according to a first embodiment of the present invention.

The image pickup apparatus is e.g. a digital camera (hereinafter simply referred to as the camera), but may be e.g. a digital video camera. Further, the image pickup apparatus may be an electronic device having a camera function, such as a mobile phone with the camera function or a computer with a camera.

The camera, denoted by reference numeral 100 in FIG. 1, has an optical system 101 including a lens, a shutter, and a diaphragm. An object image (optical image) is formed on an image pickup device 102 via the optical system 101. At this time, optical system information, such as a focal length, a shutter speed, and an aperture value, is sent from the optical system 101 to a central processing unit (CPU) 103.

The image pickup device 102 is e.g. a CCD image sensor or a CMOS image sensor, in which a plurality of pixels are arranged in a two-dimensional matrix. Further, color filters for separating incident light into color components of the colors of R (red), G (green), and B (blue), are arranged in a Bayer array on the pixels. The image pickup device 102 converts an optical image into analog signals indicative of luminance information of each pixel.

An analog signal as an output from the image pickup device 102 is converted to a digital image signal by an analog-to-digital converter (not shown). This digital image signal is RAW data before being subjected to development processing, and is stored in a primary storage device 104 by the CPU 103. Note that electric gains (hereinafter referred to as the ISO sensitivity) of the image pickup device 102 are set by the CPU 103.

A photometry sensor 105 has a plurality of photometry areas (for example, a total of 96 photometry areas formed by 12 (horizontal)×8 (vertical) areas), and detects an object luminance of each photometry area according to an amount of light incident through the optical system 101. Then, the detected object luminance values are converted to digital luminance signals by an analog-to-digital converter (not shown) and are sent to the CPU 103.

Note that the number of the photometry areas of the photometry sensor 105 is only required to be a positive number, and is not limited to the above example.

An infrared light sensor 106 is divided into the same number of areas as the photometry areas of the photometry sensor 105, and detects an amount of infrared light from each area according to an amount of light incident through the optical system 101. Then, the detected infrared light amounts are converted to digital infrared light signals by an analog-to-digital converter (not shown) and are sent to the CPU 103.

The CPU 103 controls the overall operation of the camera 100, and controls the camera 100 according to programs stored in advance. At least part of functions realized, in the following description, by the CPU 103 executing associated programs may be realized by dedicated hardware, such as an ASIC (Application-Specific Integrated Circuit).

The primary storage device 104 is a volatile storage device, such as a RAM, and is used as a work area by the CPU 103. Further, data and information stored in the primary storage device 104 are used by the image processing device, denoted by reference numeral 107, and further, are recorded in a recording medium 108M set in a recording medium drive device 108.

A secondary storage device 109 is a nonvolatile storage device, such as an EEPROM. The secondary storage device 109 stores programs (firmware) for controlling the camera 100 and information on various settings, which are used by the CPU 103.

The recording medium 108M removably set in the recording medium drive device 108 records image data and the like stored in the primary storage device 104. The recording medium 108M is e.g. a semiconductor memory card. Further, the image data and the like recorded in the recording medium 108M can be read out by the other devices, such as a personal computer.

A display section 110 displays a view finder image before photographing, and displays a photographed image obtained by photographing. Further, the display section 110 displays a GUI image for an interactive operation.

An operation section 111 is an input device group that receives information input by a user's operation and sends the input information to the CPU 103. The operation section 111 is provided with buttons, a lever, a touch panel, and so forth. Further, the operation section 111 may be an input device using voice and line of sight. Further, the operation section 111 is provided with a release button for starting photographing.

The camera 100 shown in FIG. 1 has a plurality of modes of image processing performed by the image processing device 107, and one of these modes of image processing can be selected and set on the operation section 111 as a photographing mode.

The image processing device 107 performs predetermined image processing on image data obtained by photographing. For example, the image processing device 107 performs image processing called development processing, such as white balance processing, color interpolation processing for converting an RGB Bayer array signal to three plane signals of red, green, and blue, gamma correction processing, chroma correction processing, and color phase correction processing.

Although in the illustrated example, as described hereinafter, the image processing device 107 performs arithmetic operations for white balance control, at least one or some of these functions of the image processing device 107 may be realized by the CPU 103 by software.

Figure 2:
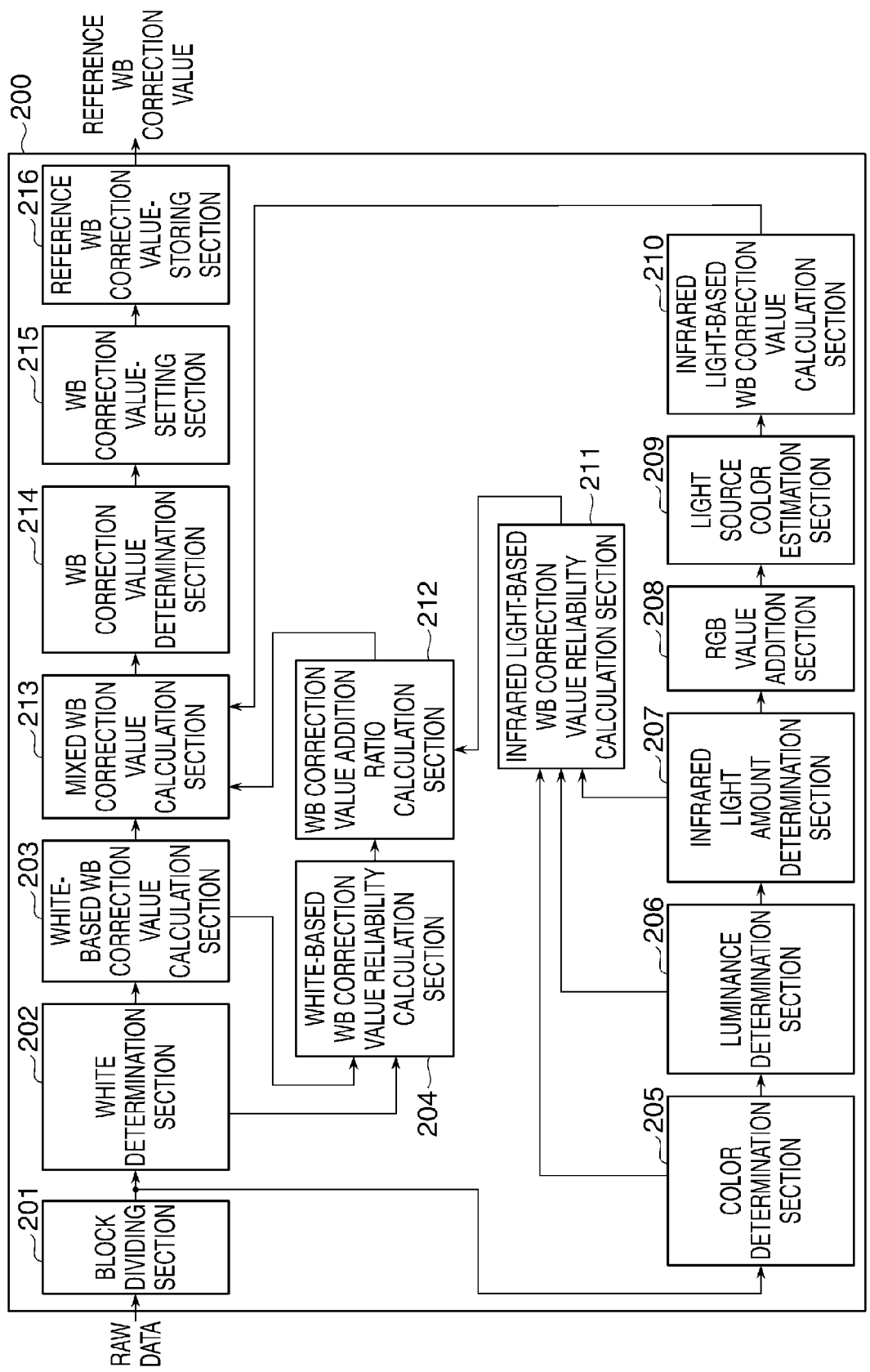
FIG. 2 is a block diagram of a white balance controller included in the image processing device appearing in FIG. 1.

FIG. 2 is a block diagram of a white balance controller 200 (hereinafter referred to as the WB controller 200) included in the image processing device 107 appearing in FIG. 1.

The WB controller 200 performs white balance processing. The WB controller 200 calculates a mixed WB correction value according to a WB correction value calculated based on pixels estimated as white (hereinafter referred to as the white-based WB correction value) and a WB correction value calculated based on an infrared light amount (hereinafter referred to as the infrared light-based WB correction value).

As shown in FIG. 2, the WB controller 200 includes a block dividing section 201, a white determination section 202, a white-based WB correction value calculation section 203, a white-based WB correction value reliability calculation section 204, a color determination section 205, a luminance determination section 206, an infrared light amount determination section 207, an RGB value addition section 208, a light source color estimation section 209, an infrared light-based WB correction value calculation section 210, an infrared light-based WB correction value reliability calculation section 211, a WB correction value addition ratio calculation section 212, and a mixed WB correction value calculation section 213. Further, the WB controller 200 includes a WB correction value determination section 214, a WB correction value-setting section 215, and a reference WB correction value-storing section 216. Processing executed by each block will be described hereinafter.

Figure 3:
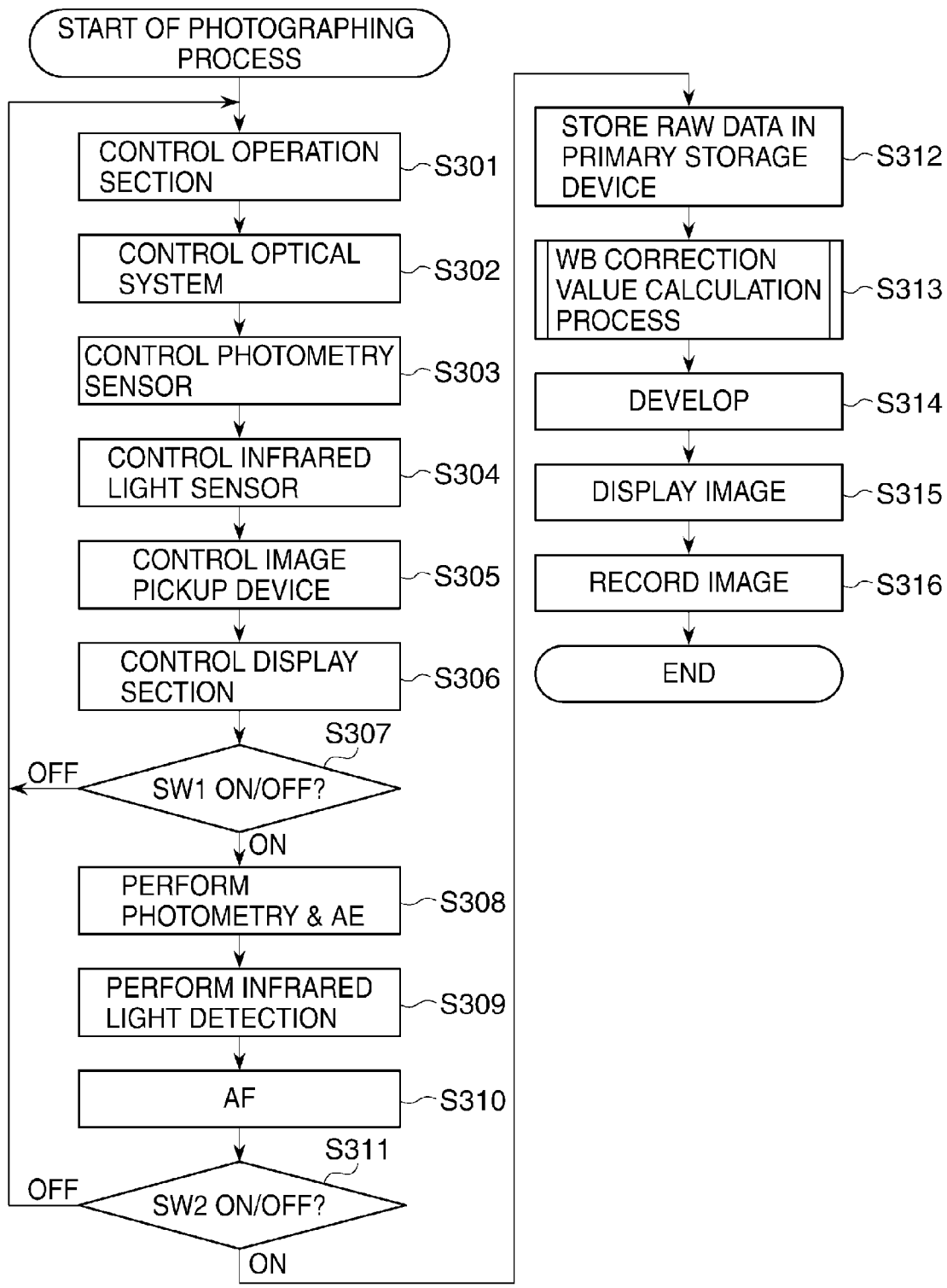
FIG. 3 is a flowchart of a photographing process performed by the digital camera shown in FIG. 1.

FIG. 3 is a flowchart of a photographing process performed by the camera 100 shown in FIG. 1.

Note that the above-mentioned release button is operated in two steps. In the following description, a SW1 of the operation section 111 represents a switch which is turned on when the release button is half-pressed, and a SW2 of the operation section 111 represents a switch which is turned on when the release button is fully pressed. Further, the photographing process in FIG. 3 is performed under the control of the CPU 103.

When the photographing process is started, the CPU 103 receives a user's input from the operation section 111 (step S301: operation section control). Then, the CPU 103 adjusts the settings of a focal length, a shutter speed, an aperture value, and so forth, of the optical system 101, according to the user's input (step S302: optical system control).

Then, the CPU 103 adjusts the photometry areas of the photometry sensor 105 according to the user's input (step S303: photometry sensor control). Further, the CPU 103 adjusts the photometry areas of the infrared light sensor 106 according to the user's input (step S304: infrared light sensor control). Then, the CPU 103 adjusts the settings of the ISO sensitivity and so forth of the image pickup device 102 according to the user's input (step S305: image pickup device control).

Then, the CPU 103 displays information on changes in the settings changed in the steps S302 to S305 on the display section 109 (step S306: display section control). Note that the processing order of the steps S302 to S305 is not limited to the illustrated example, but may be changed.

Next, the CPU 103 determines whether the SW1 of the operation section 111 is on or off (step S307). If the SW1 is off (OFF in the step S307), the CPU 103 returns to the step S301. On the other hand, if the SW1 is on (ON in the step S307), the CPU 103 measures brightness of the object using the photometry sensor 105 (step S308). Further, when in an auto-exposure (AE) mode, the CPU 103 adjusts exposure based on the shutter speed, the aperture value, and the ISO sensitivity.

Then, the CPU 103 detects the infrared light amount from each of the same areas as those of the photometry sensor 105, using the infrared light sensor 106 (step S309). Then, if an auto-focus (AF) mode is set, the CPU 103 adjusts the focus using a distance measurement sensor (not shown) (step S310). Note that the processing order of the steps S308 to S310 is not limited to the illustrated example, but may be changed.

Next, the CPU 103 determines whether the SW2 is on or off in the operation section 111 (step S311). If the SW2 is off (OFF in the step S311), the CPU 103 returns to the step S301. On the other hand, if the SW2 is on (ON in the step S311), the CPU 103 controls the shutter to expose the image pickup device 102, and stores RAW data in the primary storage device 104 (step S312).

Then, the CPU 103 controls the image processing device 107 to calculate a WB correction value for the RAW data stored in the primary storage device 104, as described hereinafter (step S313). Then, the CPU 103 corrects (i.e. develops) the RAW data stored in the primary storage device 104 using the WB correction value (mixed WB correction value) to thereby obtain image data (step S314).

After that, the CPU 103 displays an image corresponding to the developed image data on the display section 110 (step S315). The CPU 103 records the developed image data in the recording medium 108M (step S316), followed by terminating the photographing process. Note that the processing order of the steps S315 and S316 is not limited to the illustrated example, but may be changed.

Figure 4:
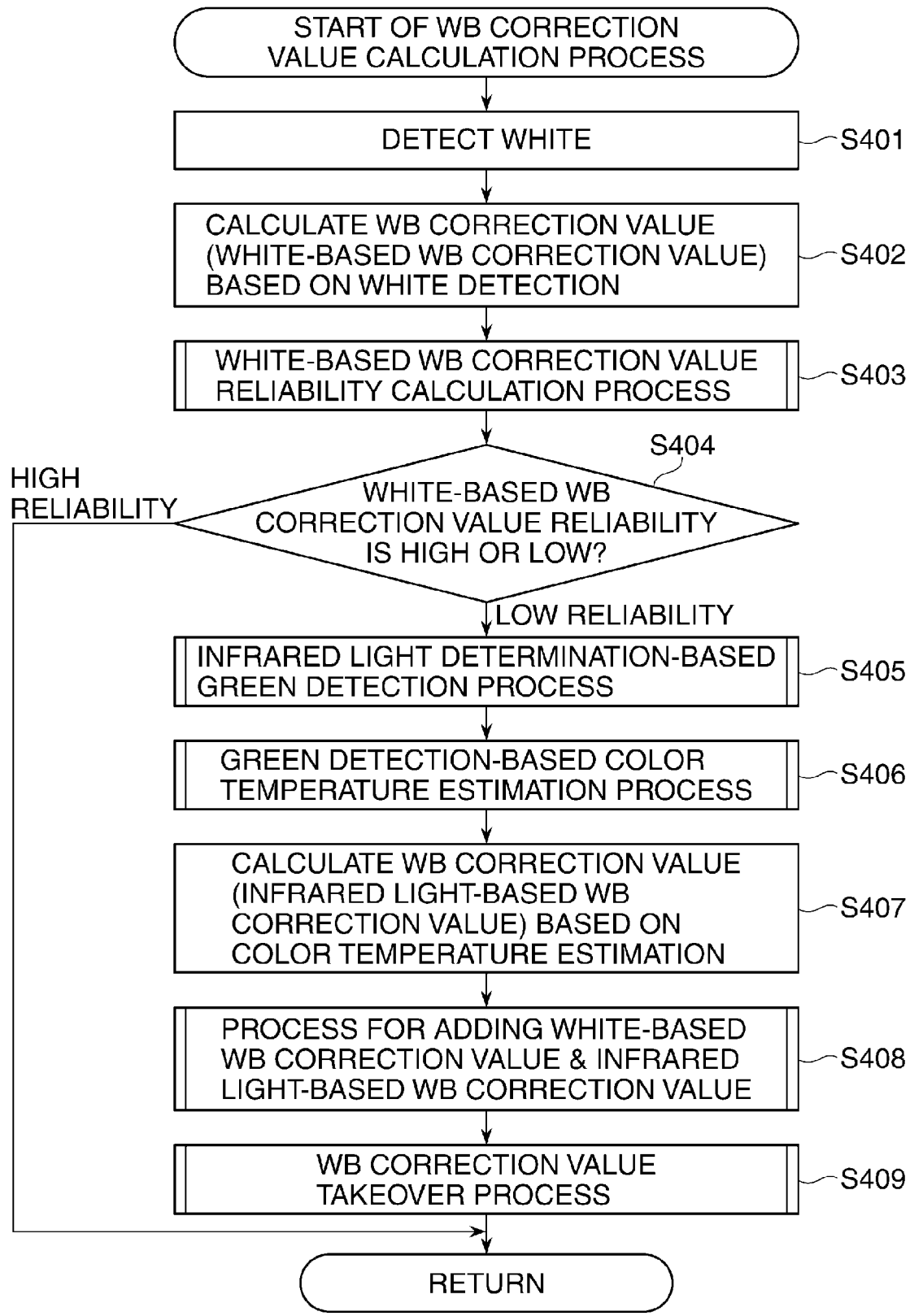
FIG. 4 is a flowchart of a WB correction value calculation process performed in a step of the photographing process in FIG. 3.

FIG. 4 is a flowchart of a WB correction value calculation process performed in the step S313 of the photographing process in FIG. 3.

Referring to FIGS. 2 and 4, the block dividing section 201 receives the RAW data (i.e. a first image) stored in the primary storage device 104, and divides an image represented by the RAW data into a predetermined number of block areas (hereinafter simply referred to as blocks) (for example, a total of 96 block areas formed by 12 (horizontal)×8 (vertical) block areas). Then, the block dividing section 201 calculates integrated values of R, G, and B signal values for each block.

Note that the number of divided blocks is not limited to the above-mentioned example, but is only required to be a positive number. Further, in this example, the number of divided blocks and the divided block areas correspond to the number of divided areas and the divided areas of each of the photometry sensor 105 and the infrared light sensor 106.

Then, the block dividing section 201 calculates a ratio R/G and a ratio B/G based on the respective integrated values of the R, G, and B signal values of each block. Then, the white determination section 202 determines blocks which are included in a white area set on a R/G-B/G coordinate plane defined by the horizontal axis representing the ratio R/G and the vertical axis representing the ratio B/G, and integrates each of the R, G, and B signal values of each of the blocks to thereby obtain integrated values Rinteg, Ginteg, and Binteg, as described hereinafter (step S401: white detection).

Figure 5:
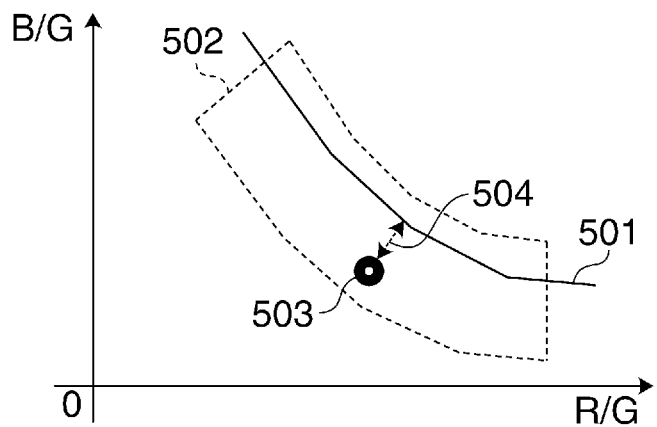
FIG. 5 is a diagram useful in explaining determination processing performed by a white determination section appearing in FIG. 2.

FIG. 5 is a diagram useful in explaining determination processing performed by the white determination section 202 appearing in FIG. 2.

Referring to FIG. 5, the horizontal axis represents the ratio R/G, and the vertical axis represents the ratio B/G. In FIG. 5, a blackbody radiation locus is denoted by reference numeral 501. A white area 502 is set such that (R/G, B/G) coordinates (i.e. a pair of a R/G value and a B/G value) of each of all colors of an achromatic object photographed using each of various lights, such as sunlight (in respective cases of a sunny place and a shady place), tungsten light, mercury lamp light, fluorescent lamp light, and flash light, exist in the area.

Although in FIG. 5, the WB correction value is calculated by extracting a seemingly achromatic pixel from the object using the R/G-B/G coordinate plane, and estimating a color of light from the light source, the WB correction value may be calculated by extracting a seemingly achromatic pixel from the object using any other suitable method.

Referring again to FIGS. 2 and 4, the white-based WB correction value calculation section 203 calculates the WB correction value (white-based WB correction value) according to the R, G, and B integrated values Rinteg, Ginteg, and Binteg, calculated with respect to the blocks within the white area 502, by the following equations (1A) to (1C) (step S402):

$R$ gain of the white-based WB correction value
$$W\_WB\_Rgain = Ginteg/Rinteg \quad (1A)$$

$G$ gain of the white-based WB correction value
$$W\_WB\_Ggain = Ginteg/Ginteg \quad (1B)$$

$B$ gain of the white-based WB correction value
$$W\_WB\_Bgain = Ginteg/Binteg \quad (1C)$$

Then, the white-based WB correction value reliability calculation section 204 calculates a reliability of the white-based WB correction value, as described hereinafter (step S403).

Figure 6:
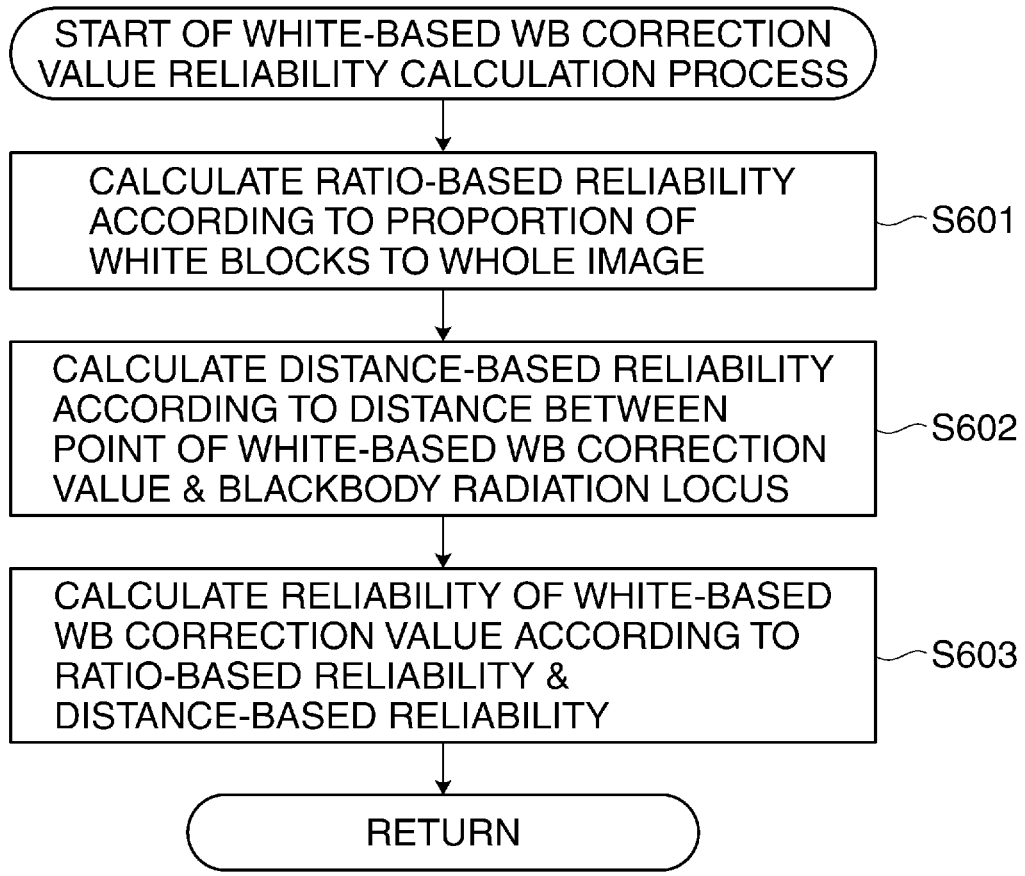
FIG. 6 is a flowchart of a white-based WB correction value reliability calculation process performed in a step of the WB correction value calculation process in FIG. 4.

FIG. 6 is a flowchart of a white-based WB correction value reliability calculation process performed in the step S403 of the WB correction value calculation process in FIG. 4.

The white-based WB correction value reliability calculation section 204 calculates a ratio-based reliability Tratio according to a ratio of the number of white blocks extracted in the step S401 in FIG. 4 to the number of all blocks (i.e. the number of blocks of the whole image) (proportion of areas each having a color evaluation value included in the white detection range to the whole image) (step S601).

Figure 7A:
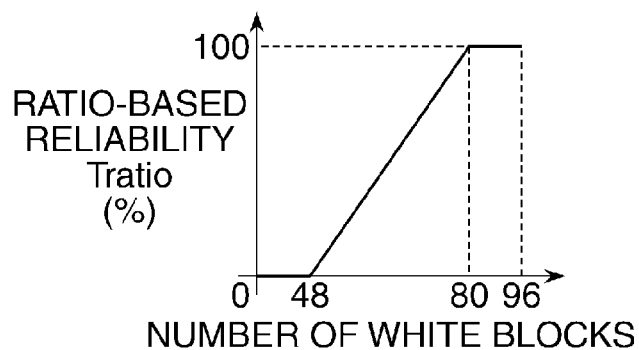
Figure 7B:
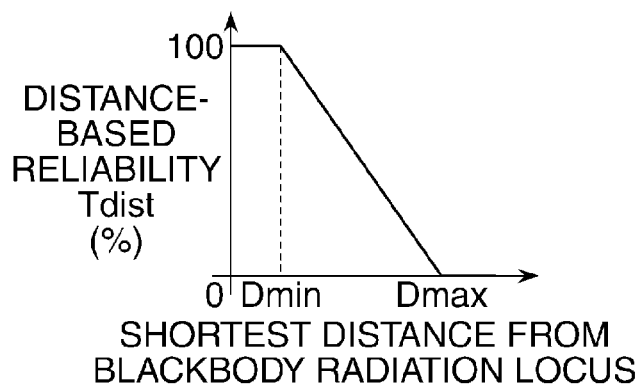
Figure 7C:
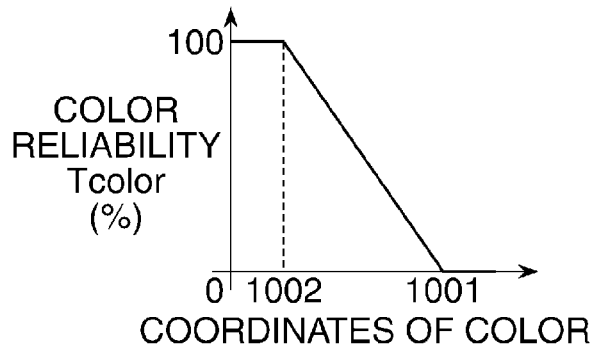
Figure 7D:
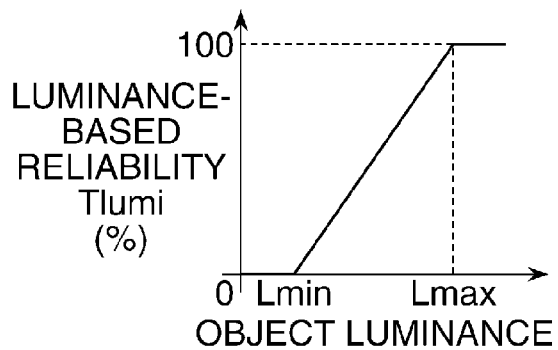
Figure 7E:
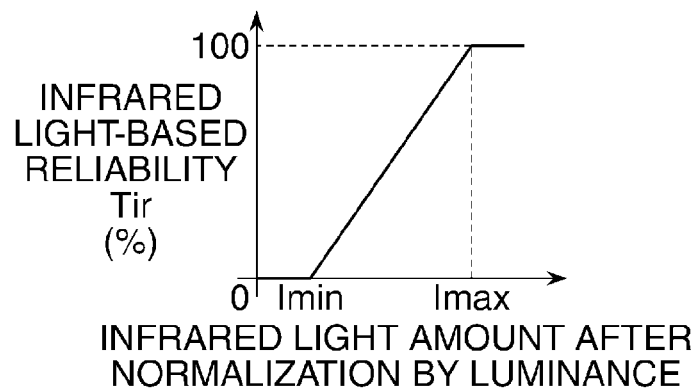
Figure 7F:
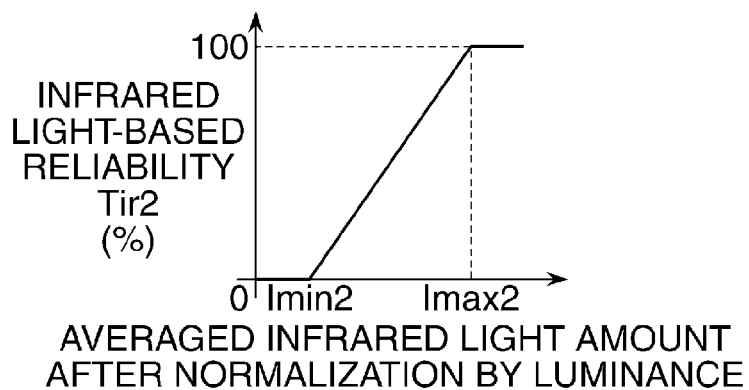
Figure 7G:
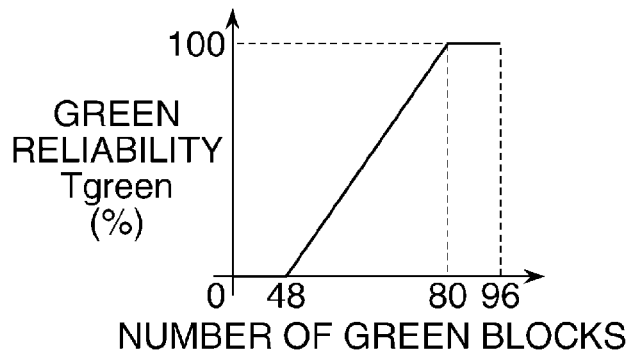
Figure 7H:
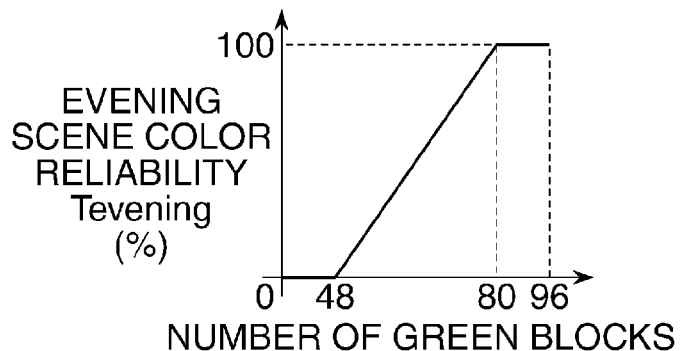

FIGS. 7A to 7H are diagrams useful in explaining tables used for reliability calculation performed by the WB controller 200 shown in FIG. 2, in which FIG. 7A shows a table for use in calculating the ratio-based reliability, FIG. 7B shows a table for use in calculating a distance-based reliability, FIG. 7C shows a table for use in calculating a color reliability, FIG. 7D shows a table for use in calculating a luminance-based reliability, FIG. 7E shows an example of a table for use in calculating an infrared light-based reliability, and FIG. 7F shows another example of the table for use in calculating the infrared light-based reliability. In addition, FIG. 7G shows a table for use in calculating a green reliability, and FIG. 7H shows a table for use in calculating an evening scene color reliability.

In calculating the ratio-based reliability Tratio, the white-based WB correction value reliability calculation section 204 refers to the table shown in FIG. 7A (ratio-based reliability table) to thereby calculate the ratio-based reliability Tratio (%).

In FIG. 7A, the horizontal axis represents the number of white blocks, and the vertical axis represents the ratio-based reliability Tratio (%). Note that in the illustrated example, the total number of blocks is 96 blocks, which is given only by way of example, but the total number of blocks is not limited to the illustrated example. That is, the ratio-based reliability table is only required to be configured such that as the ratio of the white block is larger, the ratio-based reliability Tratio (%) becomes higher.

Then, the white-based WB correction value reliability calculation section 204 determines a point of coordinates 503 in the R/G-B/G coordinate plane shown in FIG. 5, according to the R gain W_WB_Rgain and B gain W_WB_Bgain of the white-based WB correction value calculated in the step S402, by the following equations (2A) and (2B):

$$R/G \text{ corresponding to the white-based } WB \text{ correction value} = 1/W\_WB\_Rgain \quad (2A)$$

$$B/G \text{ corresponding to the white-based } WB \text{ correction value} = 1/W\_WB\_Bgain \quad (2B)$$

Then, the white-based WB correction value reliability calculation section 204 calculates a distance-based reliability Tdist (%) based on the table shown in FIG. 7B (distance-based reliability table) according to a shortest distance 504 between the point of the (R/G, B/G) coordinates 503 corresponding to the white-based WB correction value and the blackbody radiation locus 501 (step S602).

In FIG. 7B, the horizontal axis represents the shortest distance 504 between the point of the (R/G, B/G) coordinates 503 corresponding to the white-based WB correction value and the blackbody radiation locus 501, and the vertical axis represents the distance-based reliability Tdist dependent on a distance from the blackbody radiation locus 501. The distance-based reliability table is only required to be configured such that as the shortest distance between the point of the (R/G, B/G) coordinates 503 corresponding to the white-based WB correction value and the blackbody radiation locus 501 is smaller, the distance-based reliability Tdist becomes higher. The minimum distance Dmin and the maximum distance Dmax in FIG. 7B are set as desired. As the point of the (R/G, B/G) coordinates 503 is closer to the blackbody radiation locus 501, it indicates that there is a higher possibility that an achromatic color not under the light from a mercury lamp but under natural light is detected.

Next, the white-based WB correction value reliability calculation section 204 calculates a white-based WB correction value reliability Twhite by multiplying the ratio-based reliability Tratio by the distance-based reliability Tdist by the following equation (3) (step S603):

$$T\text{white} = T\text{ratio} \times T\text{dist}/100 \quad (3)$$

Then, the white-based WB correction value reliability calculation section 204 terminates the white-based WB correction value reliability calculation process, and the CPU 103 returns to the WB correction value calculation process in FIG. 4.

Next, the CPU 103 performs determination of the white-based WB correction value reliability Twhite (step S404). In this step, if the white-based WB correction value reliability Twhite is not lower than a predetermined threshold value, the CPU 103 determines that an achromatic color is detected under natural light and the reliability Twhite is high. On the other hand, if the white-based WB correction value reliability Twhite is lower than the predetermined threshold value, the CPU 103 determines that the reliability Twhite is low.

If the reliability Twhite is high (high reliability in the step S404), the CPU 103 terminates the WB correction value calculation process, and proceeds to the step S314 in FIG. 3. Then, the CPU 103 controls the image processing device 107 to convert the RAW data stored in the primary storage device 104 to image data according to the white-based WB correction value.

On the other hand, if the reliability Twhite is low (low reliability in the step S404), the CPU 103 controls the color determination section 205, the luminance determination section 206, the infrared light amount determination section 207, the RGB value addition section 208, and the infrared light-based WB correction value reliability calculation section 211 to perform processes described hereafter.

In these processes, first, green detection is performed based on infrared light determination under the control of the CPU 103 (step S405). More specifically, the image represented by the RAW data stored in the primary storage device 104 is divided into a predetermined number of blocks in the same manner as performed by the block dividing section 201. Next, it is determined whether the color of a block determined to be green is a color influenced by the light source, such as a mercury lamp, or a color of the object, based on the infrared light amount detected from the same area (i.e. block) by the infrared light sensor 106. Then, only the green determined to be a color of the object is set to an object to be subjected to calculation of green detection integrated values RintegA, GintegA, and BintegA, referred to hereinafter.

Figure 8A:
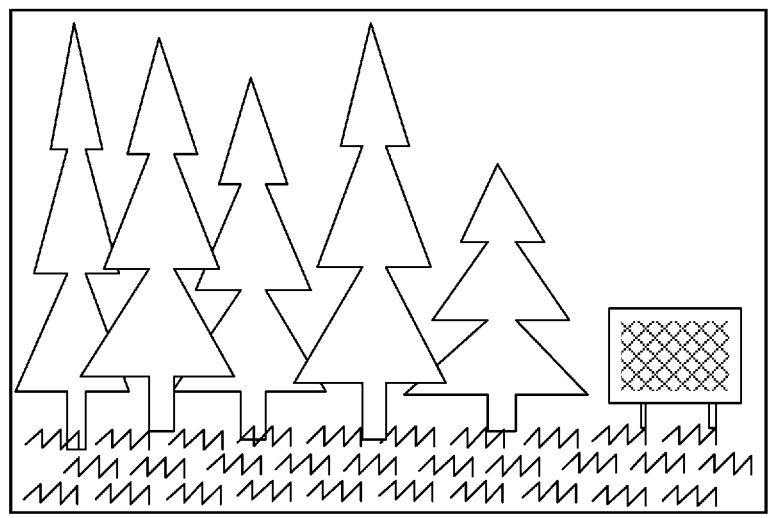
Figure 8B:
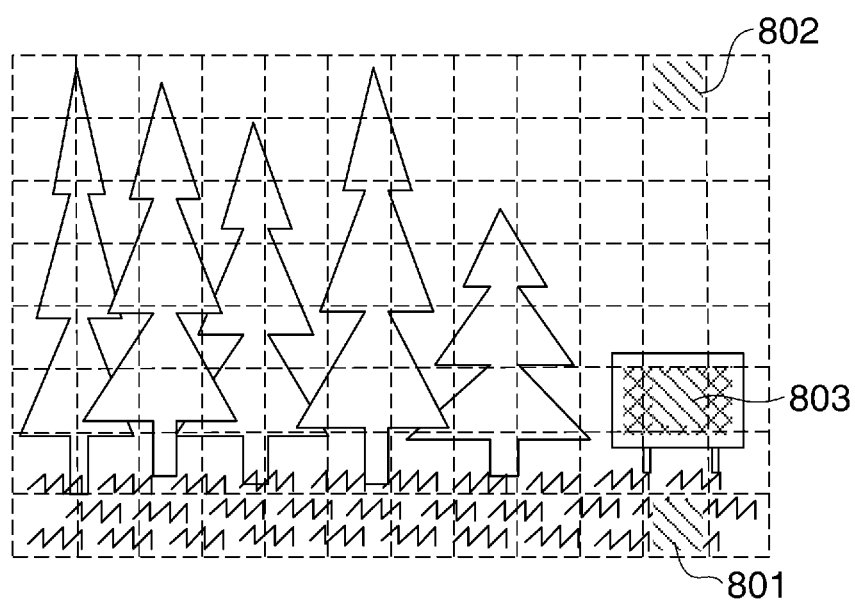

FIGS. 8A and 8B are diagrams useful in explaining the infrared light determination-based green detection performed in the step S405 of the WB correction value calculation process in FIG. 4. FIG. 8A shows an example of an image represented by RAW data, and FIG. 8B shows a state in which the image shown in FIG. 8A is divided into a predetermined number of blocks.

Referring to FIG. 8B, reference numeral 801 denotes a block of green grass, and reference numeral 802 denotes a block of the blue sky. Further, reference numeral 803 denotes a block of a white signboard. Now, assuming that the image shown in FIG. 8A is obtained by photographing under natural light, since the sun light includes infrared light, the block of green grass 801 is determined to show a color of the object because the infrared light is reflected from the block, and hence the block 801 is set to an object to be subjected to the calculation of the green detection integrated values RintegA, GintegA, and BintegA. The blue sky block 802 and the white signboard block 803 are not green, and hence these blocks are not set to objects to be subjected to the calculation of the green detection integrated values RintegA, GintegA, and BintegA.

On the other hand, assuming that the image shown in FIG. 8A is obtained by photographing under a mercury lamp in the night, the white signboard block 803 is influenced by the color of light from the mercury lamp, and is sometimes determined to be green. Further, the green grass block 801 is also influenced by the color of light from the mercury lamp, and hence the block 801 becomes a color different from the original green. In this case, since the light from the mercury lamp does not include infrared light, the respective colors of the green grass block 801 and the white signboard block 803 are determined to be influenced by the light from the mercury lamp. As a result, although these blocks are green, they are not set to objects to be subjected to the calculation of the green detection integrated values RintegA, GintegA, and BintegA.

Figure 9:
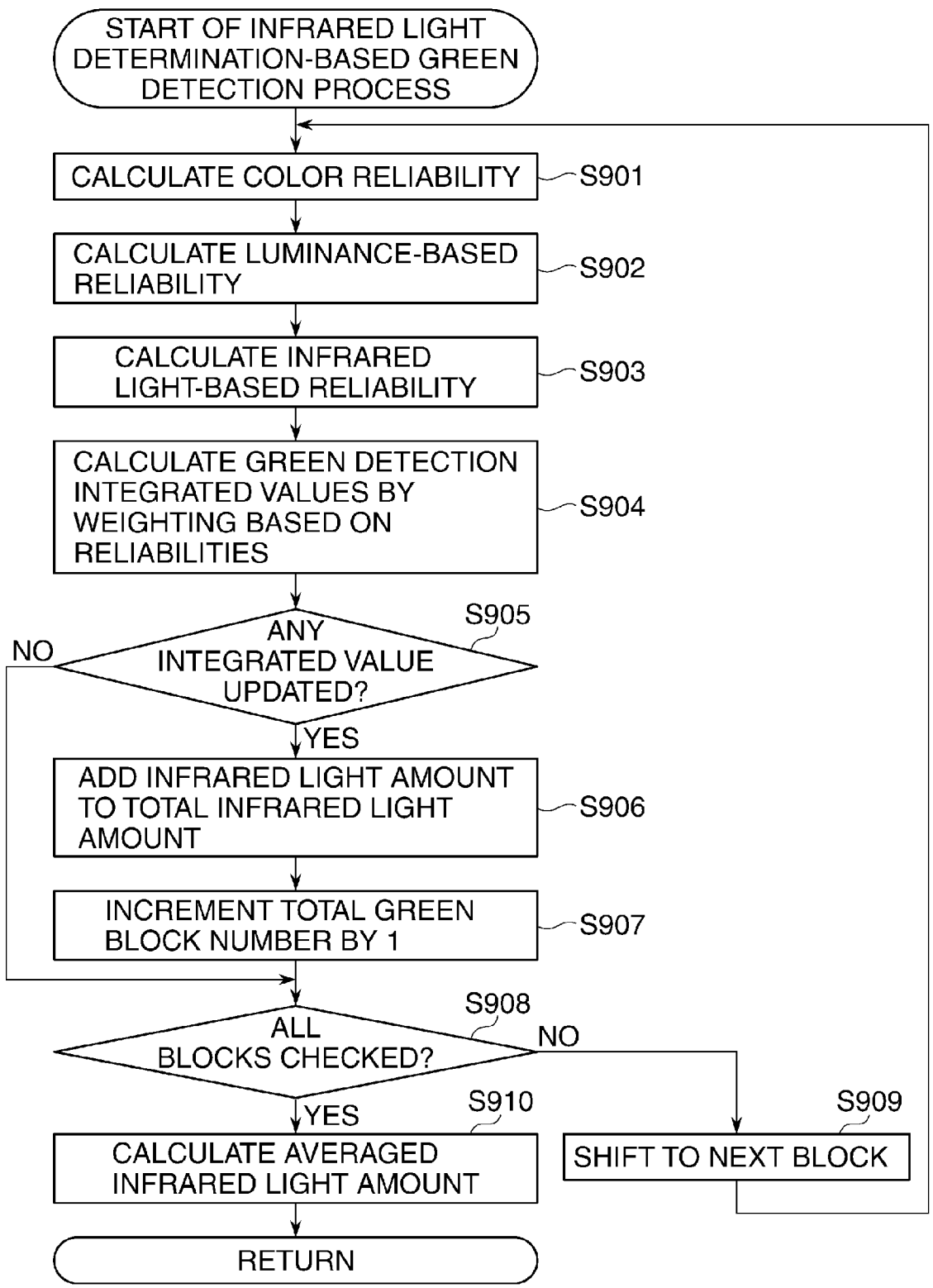
FIG. 9 is a flowchart of an infrared light determination-based green detection process performed in the step of the WB correction value calculation process in FIG. 4.

FIG. 9 is a flowchart of an infrared light determination-based green detection process performed in the step S405 of the WB correction value calculation process in FIG. 4.

The color determination section 205 extracts a color included in a green detection area (color detection frame) set in advance, and calculates a color reliability Tcolor by referring to the table shown in FIG. 7C (color reliability table) (step S901).

In FIG. 7C, the horizontal axis represents (R/G, B/G) coordinates corresponding to the color of each block, and the vertical axis represents the color reliability Tcolor. In FIG. 7C, as described hereinafter, an area 1002 in which the color reliability is 100% (see FIG. 10A) is provided inside the green detection area, denoted by reference numeral 1001 (see also FIG. 10A), and when a block is not included in the green detection area 1001, the color reliability of the block is set to 0%. Further, when a block is included in the green detection area 1001, and is also included in the area 1002 in which the color reliability is 100%, the color reliability of the block is set to 100%. Further, in a case where a block is included in the green detection area 1001, but is not included in the area 1002 in which the color reliability is 100%, the color reliability Tcolor is calculated by linear interpolation such that it is gradually changed according to the infrared light amount.

Note that the area 1002 in which the color reliability is 100% is set inside the green detection area 1001, by way of example, but this is not limitative. That is, the color reliability Tcolor may be set to be higher as the block is closer to the central portion of the green detection area 1001. By thus taking into account the color reliability Tcolor, it is possible to reduce a very large difference in the WB correction value caused by variation in color.

Next, the luminance determination section 206 calculates a luminance-based reliability Tlumi based on the object luminance detected by the photometry sensor 105, by referring to the table shown in FIG. 7D (luminance-based reliability table), so as to determine whether or not the color of the object is bright enough to calculate the color reliability Tcolor (step S902).

In FIG. 7D, the horizontal axis represents (R/G, B/G) coordinates corresponding to the object luminance of each block and the vertical axis represents the luminance-based reliability Tlumi. The luminance-based reliability table in FIG. 7D is configured such that the luminance-based reliability Tlumi is higher as the object luminance is higher. By thus taking into account the luminance-based reliability Tlumi, it is possible to positively prevent such erroneous determination that an image of a night scene or the like which is very dark is determined as photographed under natural light.

Then, the infrared light amount determination section 207 calculates an infrared light-based reliability Tir, based on the infrared light amount detected by the infrared light sensor 106, by referring to the table shown in FIG. 7E (infrared light-based reliability table) (step S903). The infrared light-based reliability Tir is a reliability indicating, for example, which of a possibility that an achromatic object has been photographed under the green light from a light source, such as a mercury lamp, and a possibility that green plant has been photographed under natural light, is higher.

Note that variation in infrared light amount, caused by changes in brightness, can be suppressed by normalizing the infrared light amount by the object luminance detected by the photometry sensor 105 and thereby using a ratio of the infrared light amount to the object luminance.

Referring to FIG. 7E, if the infrared light amount is smaller than the minimum value Imin, the color of the block is regarded as influenced by the light from the light source, whereas if the infrared light amount is larger than the maximum value Imax, the color of the block is regarded as the color of the object. Further, in a case where the infrared light amount is between the minimum value Imin and the maximum value Imax, the infrared light-based reliability Tir is set by linear interpolation such that it is progressively changed according to the infrared light amount.

Next, the RGB value addition section 208 performs weighted integration with respect to each of the R, G, and B signal values of a block as a processing target, according to the color reliability Tcolor, the luminance-based reliability Tlumi, and the infrared light-based reliability Tir, by the following equations (4A) to (4C) (step S904):

$$RintegA = RintegA + Rij \times (Tcolor/100 \times Tlumi/100 \times Tir/100) \quad (4A)$$

$$GintegA = GintegA + Gij \times (Tcolor/100 \times Tlumi/100 \times Tir/100) \quad (4B)$$

$$BintegA = BintegA + Bij \times (Tcolor/100 \times Tlumi/100 \times Tir/100) \quad (4C)$$

wherein Rij represents the integrated value of an R signal value in an i-th/j-th block, Gij represents the integrated value of a G signal value in an i-th/j-th block, and Bij represents the integrated value of a B signal value in an i-th/j-th block. Note that i represents a block number of each block in the horizontal direction (any of 0 to 11), and j represents a block number of the same in the vertical direction (any of 0 to 7).

The integrated values (i.e. added values) thus calculated by weighted integration are the aforementioned green detection integrated values RintegA, GintegA, and BintegA, respectively. Note that the green detection integrated values RintegA, GintegA, and BintegA are initialized to 0 only once before processing a first block.

Figure 10A:
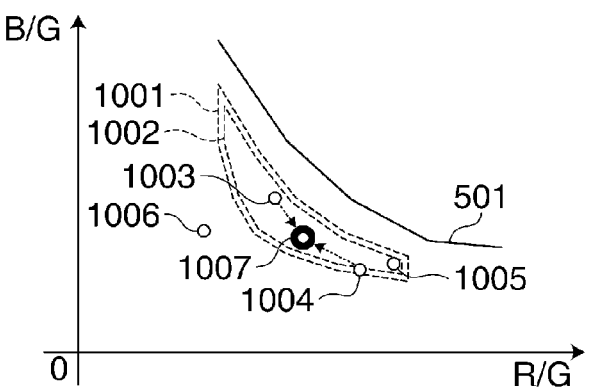
Figure 10B:
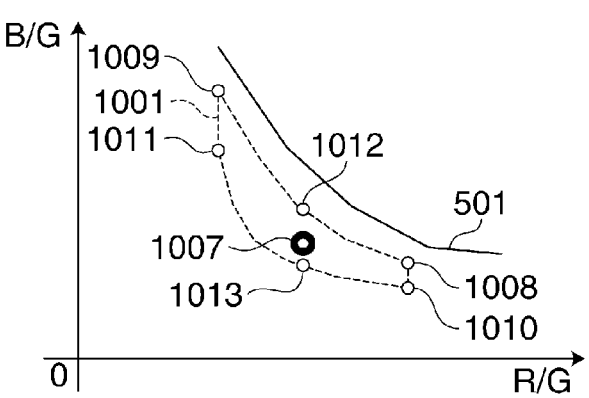
Figure 10C:
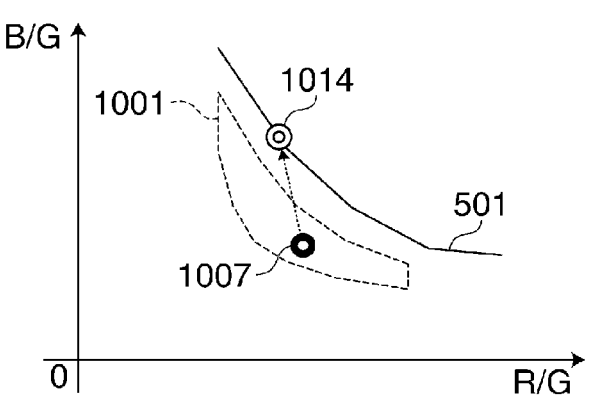
Figure 10D:
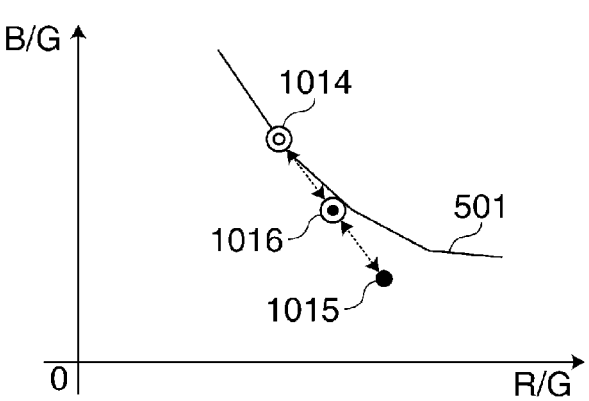

FIGS. 10A to 10D are diagrams useful in explaining calculation of the WB correction value, which is performed by the WB controller 200 shown in FIG. 2, in which FIG. 10A is a diagram useful in explaining green detection based on infrared light determination, FIG. 10B is a diagram useful in explaining color temperature estimation based on green detection, FIG. 10C is a diagram useful in explaining WB correction value calculation based on color temperature estimation, and FIG. 10D is a diagram useful in explaining calculation of a final WB correction value based on the white-based WB correction value and the infrared light-based WB correction value.

Referring to FIG. 10A, there is shown a (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. An example of the position of a color which is high in all reliabilities, in the (R/G, B/G) coordinate plane, is denoted by reference numeral 1003. An example of the position of a color which is included in the green detection area 1001 but is not included in the area 1002 where the color reliability is 100%, i.e. which is lower in color reliability Tcolor, in the (R/G, B/G) coordinate plane, is denoted by reference numeral 1004. Further, an example of the position of a color which is lower in luminance-based reliability Tlumi or infrared light-based reliability Tir, in the (R/G, B/G) coordinate plane, is denoted by reference numeral 1005, and an example of the position of a color which is not included in the green detection area 1001, in the (R/G, B/G) coordinate plane, is denoted by reference numeral 1006. Further, a position of the (R/G, B/G) coordinates, which corresponds to the green detection integrated values RintegA, GintegA, and BintegA, i.e. a position of (RintegA/GintegA, BintegA/GintegA) coordinates is denoted by reference numeral 1007.

First, the color at the position 1003, which is high in all reliabilities, satisfies all required conditions, and hence the value of the color is added as it is. On the other hand, the color at the position 1004 is lower in color reliability Tcolor, and hence a value obtained by multiplying the value of the color by an addition ratio of e.g. 0.5 is added. Note that the addition ratio of a color is determined according to a position of the color in an area which is within the green detection area 1001 but outside the area 1002 in which the color reliability is 100%, in the (R/G, B/G) coordinate plane.

Next, as for the color corresponding to the position 1005 which is low in luminance-based reliability Tlumi or infrared light-based reliability Tir, if the luminance-based reliability Tlumi and infrared light-based reliability Tir are both not lower than a predetermined threshold value, a value obtained by multiplying the value of the color by a predetermined addition ratio is added, but if at least one of these reliabilities is lower than the predetermined threshold value, the value of the color is not added even when the color 1005 is included in the green detection area 1001. Finally, as for the color corresponding to the position 1006 which is not included in the green detection area 1001, even if both of the luminance-based reliability Tlumi and infrared light-based reliability Tir are high, the value of the color is not added, i.e. not integrated.

Referring again to FIG. 9, the CPU 103 determines whether or not at least one of the green detection integrated values RintegA, GintegA, and BintegA has been updated (step S905). If at least one of the green detection integrated values RintegA, GintegA, and BintegA has been updated (YES to the step S905), the CPU 103 determines that the color of the block is the color of the object. Then, to calculate an averaged infrared light amount in blocks from which the color of the object is detected, the infrared light-based WB correction value reliability calculation section 211 adds an infrared light amount IRij after being normalized by a luminance of the block, to a total infrared light amount IRtotal, by the following equation (5) (step S906):

$$IRtotal=IRtotal+IRij \quad (5)$$

wherein IRij represents an infrared light amount in an i-th and j-th block after being normalized by a luminance value detected of the block. Note that, as mentioned hereinabove, i represents a block number of each block in the horizontal direction (any of 0 to 11), and j represents a block number of the same in the vertical direction (any of 0 to 7).

Note that normalization processing performed in this step is processing for dividing the infrared light amount in the block by a luminance value detected of the block by the photometry sensor 105. Further, the total infrared light amount IRtotal is initialized to 0 only once before processing the first block.

Next, to calculate a ratio Nratio (referred to hereinafter) of the number of blocks from which the color of the object is detected to the number of blocks of the whole image, the infrared light-based WB correction value reliability calculation section 211 counts up a total green block number Ntotal by the following equation (6) (step S907):

$$Ntotal=Ntotal+1 \quad (6)$$

Note that the total number of green blocks Ntotal is initialized to 0 only once before processing the first block.

Then, the CPU 103 determines whether or not all the divided blocks have been checked (step S908). Note that unless at least one of the green detection integrated values RintegA, GintegA, and BintegA has been updated (NO to the step S905), the CPU 103 determines that the color of the object is not detected, and proceeds to the step S908.

If all the blocks have not been checked (NO to the step S908), the CPU 103 shifts processing to the next block (step S909), and returns to the step S901. On the other hand, if all the blocks have been checked (YES to the step S908), the infrared light-based WB correction value reliability calculation section 211 calculates an averaged infrared light amount IRave of the blocks from which the color of the object is detected, by the following equation (7) according to the total infrared light amount IRtotal and the total number of green blocks Ntotal (step S910). Then, the CPU 103 returns to the WB correction value calculation process in FIG. 4.

$$IRave=IRtotal/Ntotal \quad (7)$$

A process for adding the white-based WB correction value and the infrared light-based WB correction value is performed, as will be described hereinafter with reference to FIG. 12, using the R, G, and B integrated values RintegA, GintegA, and BintegA, calculated by the above-described processing, of the blocks determined to have the color of the object, the ratio Nratio, calculated by the following equation (8), of the number of blocks determined to have the color of the object to the number of blocks of the whole image, and the averaged infrared light amount IRave of the blocks determined to have the color of the object.

$$Nratio=Ntotal/\text{total number of blocks} \times 100 \quad (8)$$

wherein the total number of blocks, in the illustrated example, is equal to 12×8=96.

Referring again to FIG. 4, the light source color estimation section 209 estimates the color temperature of light from the light source used in photographing, i.e. natural light, based on the coordinates of the position 1007 in FIG. 10B, which corresponds to the green detection integrated values RintegA, GintegA, and BintegA (step S406).

Figure 11:
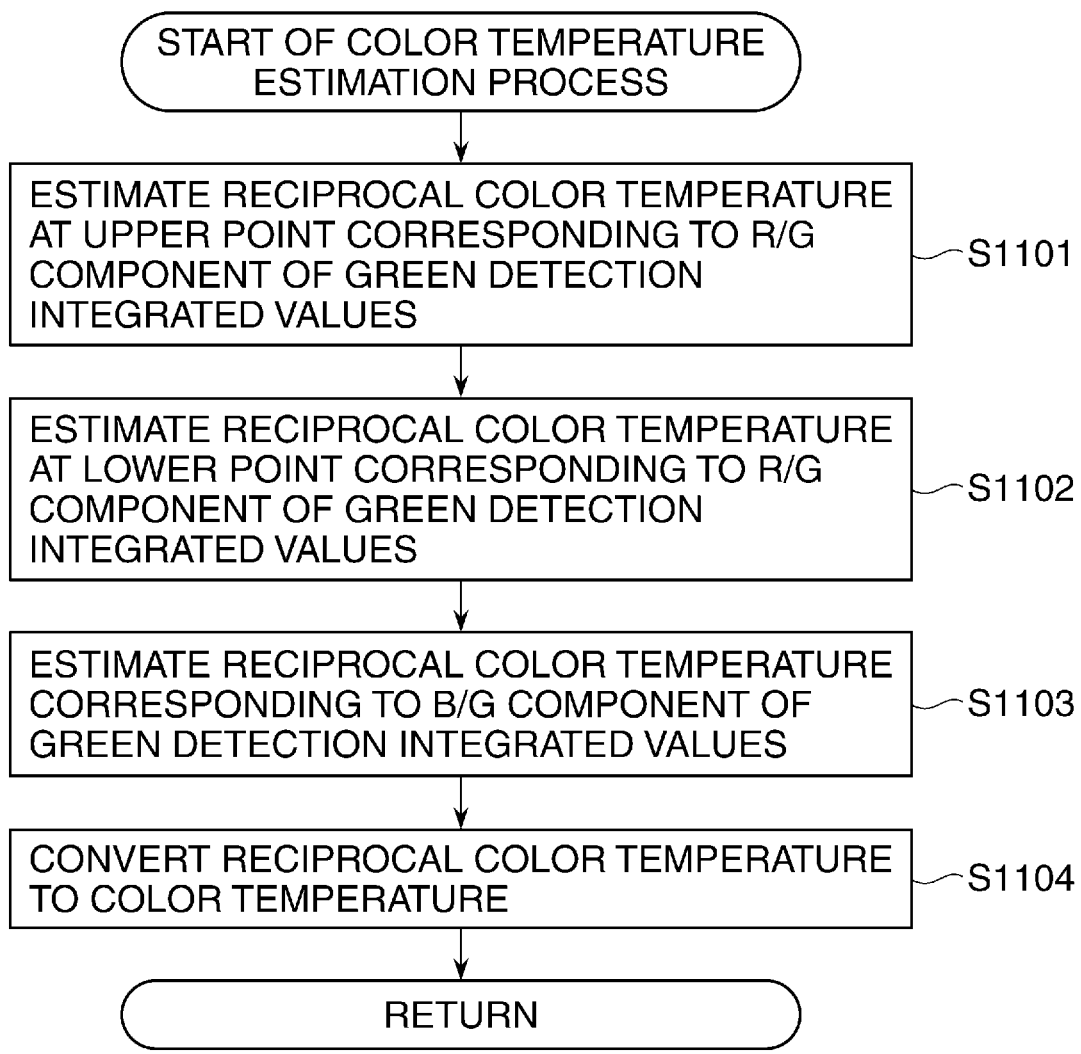
FIG. 11 is a flowchart of a green detection-based color temperature estimation process performed in a step of the WB correction value calculation process in FIG. 4.

FIG. 11 is a flowchart of a green detection-based color temperature estimation process performed in the step S406 of the WB correction value calculation process in FIG. 4.

Referring to FIGS. 10B and 11, in FIG. 10B, similar to FIG. 10A, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. It is assumed that points at the corners of the green detection area 1001, denoted by reference numerals 1008 to 1011, each hold a reciprocal color temperature of light from a light source. Further, the points 1008 and 1010 are in a low color temperature area, and the points 1009 and 1011 are in a high color temperature area.

When the color temperature estimation process is started, the light source color estimation section 209 calculates a reciprocal color temperature of light from the light source at a point 1012 corresponding to the R/G component of the green detection integrated values RintegA, GintegA, and BintegA, by performing linear interpolation using the reciprocal color temperature of light from the light source corresponding to the point 1008 in the low color temperature area and the reciprocal color temperature of light from the light source corresponding to the point 1009 in the high color temperature area (step S1101).

Then, the light source color estimation section 209 calculates a reciprocal color temperature of light from the light source at a point 1013 corresponding to the R/G component of the green detection integrated values RintegA, GintegA, and BintegA, by performing linear interpolation using the reciprocal color temperature of light from the light source corresponding to the point 1010 in the low color temperature area and the reciprocal color temperature of light from the light source corresponding to the point 1011 in the high color temperature area (step S1102).

The light source color estimation section 209 calculates a reciprocal color temperature of light from the light source corresponding to the B/G component of the green detection integrated values RintegA, GintegA, and BintegA, by performing linear interpolation using the reciprocal color temperature of light from the light source corresponding to the point 1012 and the reciprocal color temperature of light from the light source corresponding to the point 1013 (step S1103).

Then, the light source color estimation section 209 converts the reciprocal color temperature of light from the light source, calculated in the step S1103, to a color temperature (step S1104). Then, the light source color estimation section 209 terminates the color temperature estimation process, and the CPU 103 returns to the WB correction value calculation process in FIG. 4.

Using the color temperature of light from the light source at the point 1007 of the coordinates corresponding to the green detection integrated values RintegA, GintegA, and BintegA, obtained by the above-described color temperature estimation process, processing described hereafter is performed.

Referring to FIGS. 4 and 10C, the infrared light-based WB correction value calculation section 210 calculates a WB correction value (infrared light-based WB correction value) corresponding to the color temperature of light from the light source estimated in the step S406 (step S407).

In FIG. 10C, similar to FIGS. 10A and 10B, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. Here, assuming that a green object including infrared light is detected and hence the object can be determined to be photographed under natural light, the infrared light-based WB correction value calculation section 210 calculates the (RGg, BGg) coordinates of a point corresponding to the color temperature on the blackbody radiation locus 501. Then, the infrared light-based WB correction value calculation section 210 calculates infrared light-based WB correction value 1014 corresponding to the calculated coordinates by the following equations (9A) to (9C):

infrared light-based WB correction value R gain
$$IR\_WB\_Rgain = 1/RGg \quad (9A)$$

infrared light-based WB correction value G gain
$$IR\_WB\_Ggain = 1 \quad (9B)$$

infrared light-based WB correction value B gain
$$IR\_WB\_Bgain = 1/BGg \quad (9C)$$

Using the infrared light-based WB correction value 1014 calculated as above and the white-based WB correction value, the following process for adding the white-based WB correction value and the infrared light-based WB correction value is performed. Here, the WB correction value addition ratio calculation section 212 and the mixed WB correction value calculation section 213 add the white-based WB correction value and the infrared light-based WB correction value at a predetermined ratio, to thereby calculate the final WB correction value (mixed WB correction value) (step S408).

Figure 12:
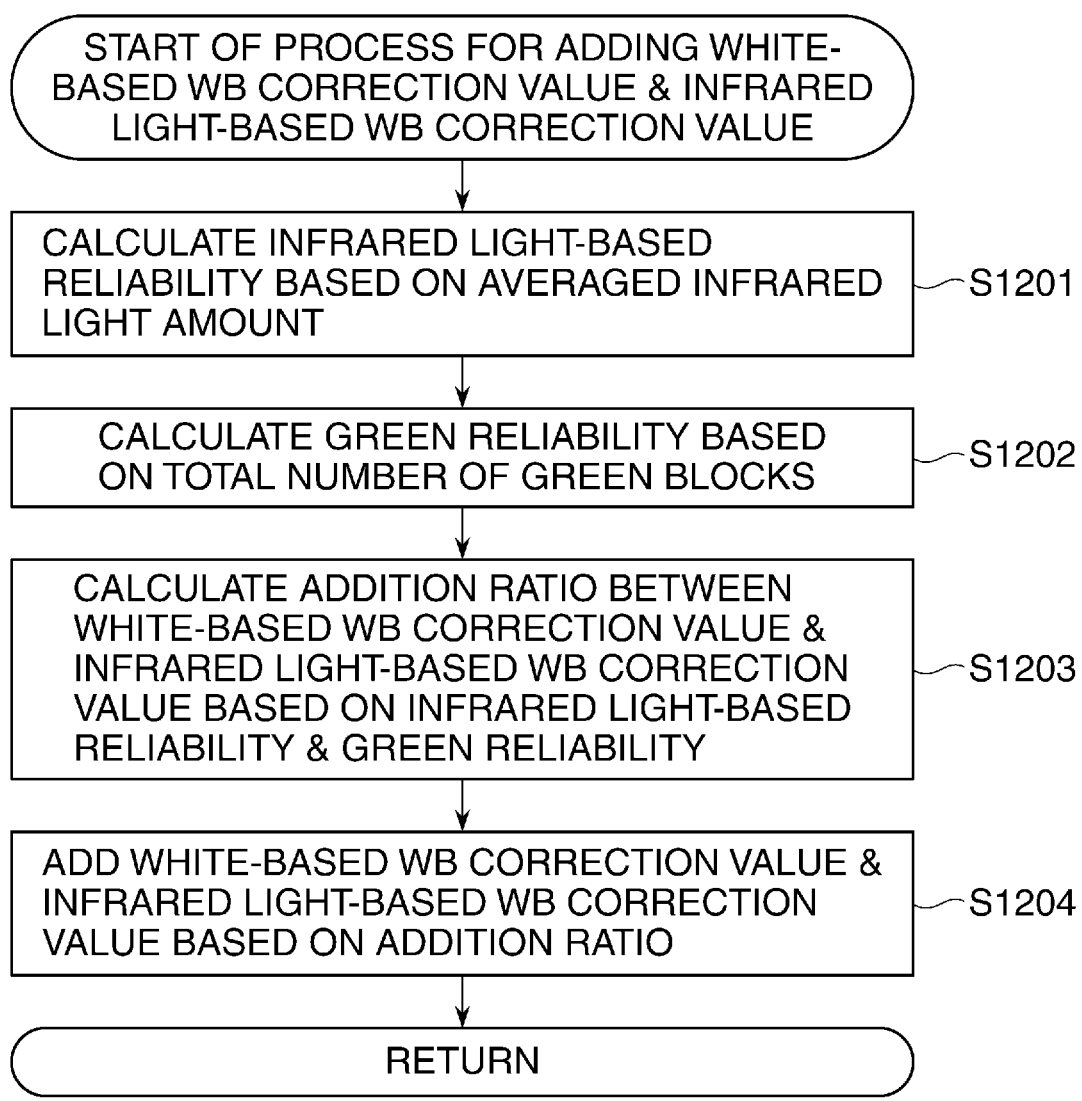
FIG. 12 is a flowchart of a process for adding the white-based WB correction value and the infrared light-based WB correction value, which is performed in a step of the WB correction value calculation process in FIG. 4.

FIG. 12 is a flowchart of the process for adding the white-based WB correction value and the infrared light-based WB correction value, which is performed in the step S408 of the WB correction value calculation process in FIG. 4.

Referring to FIGS. 10D and 12, in FIG. 10D, similar to FIGS. 10A to 10C, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. When the addition process is started, the WB correction value addition ratio calculation section 212 calculates an infrared light-based reliability Tir2 based on the averaged infrared light amount IRave of the blocks determined, in the step S405, to have the color (green) of the object (step S1201).

Note that the infrared light-based reliability Tir2 is calculated by referring to the table shown in FIG. 7F (infrared light-based reliability table). However, since this table is similar to the table shown in FIG. 7E, description thereof is omitted.

Then, the WB correction value addition ratio calculation section 212 calculates a green reliability Tgreen based on the ratio Nratio of the number of the blocks determined, in the step S405, to have the color (green) of the object to the number of all blocks (step S1202).

Note that the green reliability Tgreen is calculated by referring to the table shown in FIG. 7G (green reliability table). However, since this table is similar to the table shown in FIG. 7A, description thereof is omitted. Further, in the table shown in FIG. 7G, the values on the horizontal axis are indicated, by way of example, but the numbers of green blocks are not limited thereto. That is, the green reliability table is only required to be configured such that as the ratio of the number of blocks determined to have the color (green) of the object is larger, the green reliability Tgreen becomes higher.

Next, based on the infrared light-based reliability Tir2 and the green reliability Tgreen, the WB correction value addition ratio calculation section 212 calculates an addition ratio Ratio_W_IR between the white-based WB correction value and the infrared light-based WB correction value, by the following equation (10) (step S1203):

$$Ratio\_W\_IR = Tir2 \times Tgreen/100 \quad (10)$$

Note that in the step S1203, the addition ratio Ratio_ W_IR may be calculated by taking into account the reliability of the white-based WB correction value calculated in the above-described step S403. Further, the addition ratio Ratio_ W_IR may be set such that one of the white-based WB correction value and the infrared light-based WB correction value is used depending on the reliability.

Next, the mixed WB correction value calculation section 213 calculates a WB correction value (mixed WB correction value) WB_Rmix by adding together the white-based WB correction value and the infrared light-based WB correction value, by the following equation (11) using the addition ratio Ratio_W_IR (step S1204):

$$WB\_Rmix = (WB\_Rw \times (100 - Ratio\_W\_IR) + WB\_Rir \times Ratio\_W\_IR)/100 \quad (11)$$

wherein WB_Rw represents the R gain of the white-based WB correction value, WB_Rir represents the R gain of the infrared light-based WB correction value, and WB_Rmix represents the R gain of the mixed WB correction value.

Note that the G gain and the B gain of the mixed WB correction value are also calculated by a similar equation to the equation for calculating the R gain. Then, the CPU 103 returns to the WB correction value calculation process in FIG. 4.

In FIG. 10D, a point of (R/G, B/G) coordinates corresponding to the infrared light-based WB correction value is denoted by reference numeral 1014, and a point of (R/G, B/G) coordinates corresponding to the white-based WB correction value is denoted by reference numeral 1015. Further, a point of (R/G, B/G) coordinates corresponding to the mixed WB correction value is denoted by reference numeral 1016.

The coordinates of a point obtained by dividing a straight line connecting the point 1014 and the point 1015 according to the addition ratio Ratio_W_IR are set to the (R/G, B/G) coordinates of the point 1016 corresponding to the mixed WB correction value. With this processing, it is possible to smoothly shift a value between the white-based WB correction value and the infrared light-based WB correction value.

Referring again to FIG. 4, the CPU 103 performs a takeover process for taking over the WB correction value, by controlling the WB correction value determination section 214, the WB correction value-setting section 215, and the reference WB correction value-storing section 216 (step S409). In the step S409, the CPU 103 determines a WB correction value to be used for image data obtained through current photographing (i.e. a second image obtained through photographing performed later than photographing the first image), according to the WB correction value obtained through previous photographing (hereinafter referred to as the reference white balance correction value (reference WB correction value)), and the number of white blocks and the infrared light amount used in calculating the mixed WB correction value.

Figure 13:
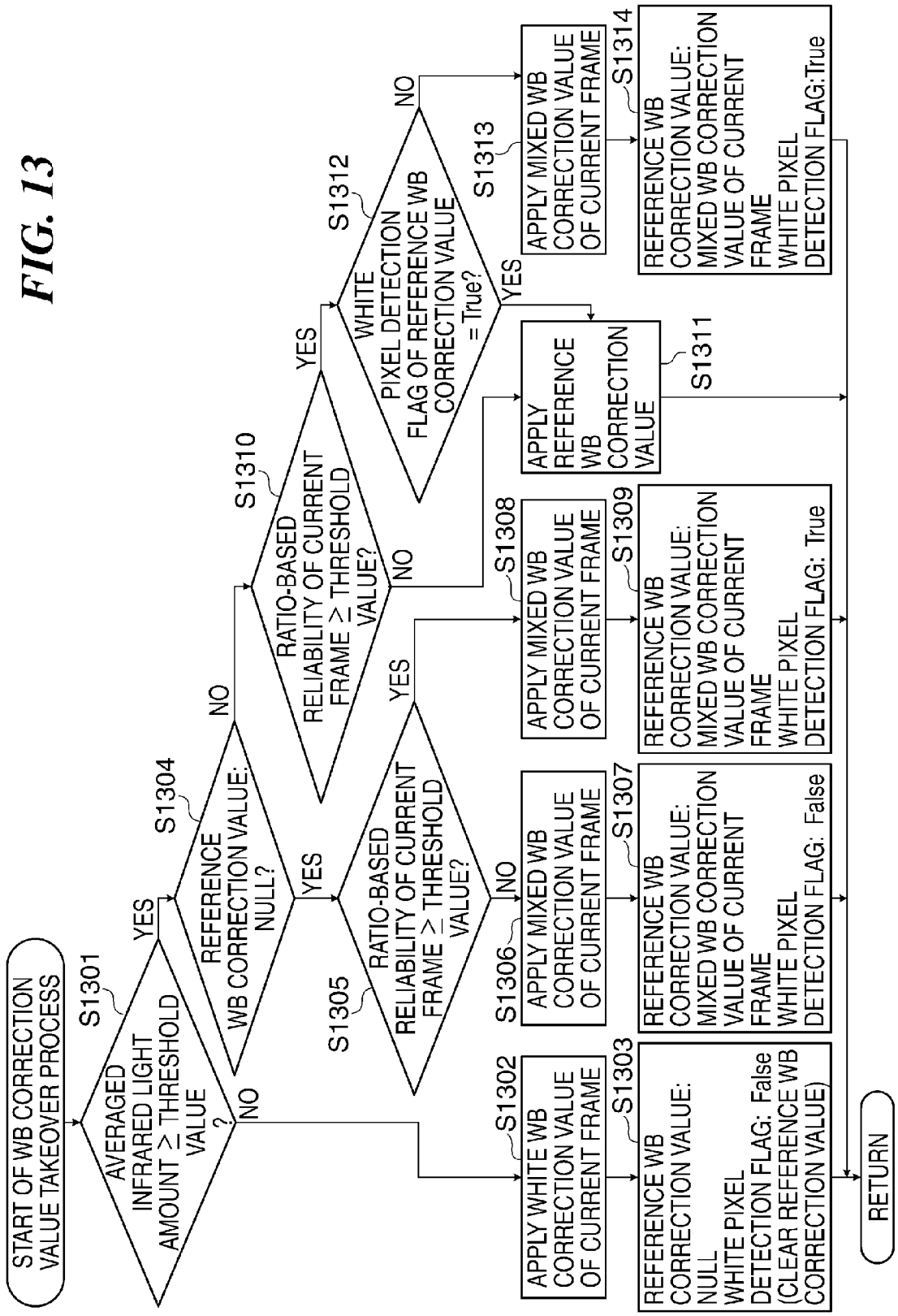
FIG. 13 is a flowchart of a takeover process performed in a step of the WB correction value calculation process in FIG. 4.

FIG. 13 is a flowchart of the takeover process performed in the step S409 of the WB correction value calculation process in FIG. 4.

When the takeover process for taking over the WB correction value is started, the WB correction value determination section 214 determines whether or not the averaged infrared light amount calculated in the step S910 of the infrared light determination-based green detection process described hereinbefore with reference to FIG. 9 is not smaller than a predetermined infrared light threshold value (step S1301). Note that the infrared light threshold value is a threshold value for determining whether or not an amount of infrared light has been detected which is large enough to use the infrared light-based WB correction value in calculating the mixed WB correction value.

If the averaged infrared light amount is smaller than the infrared light threshold value (NO to the step S1301), the WB correction value-setting section 215 sets the white-based WB correction value calculated in the step S403 as the WB correction value to be applied to the image data (step S1302). Note that the mixed WB correction value calculated in the step S408 may be used, but in this case, the addition ratio of the infrared light-based WB correction value is reduced.

The step S1302 is always executed in a case where the averaged infrared light amount is smaller than the infrared light threshold value. Further, the step S1302 is executed also in a case where the averaged infrared light amount was not smaller than the infrared light threshold value in preceding photographing, but has become smaller than the infrared light threshold value this time. If the averaged infrared light amount has changed, this indicates that the object condition has changed, and hence the reference WB correction value is inhibited from being taken over. As described hereinafter, the reference WB correction value is used in order to reduce variation in WB correction value, which is caused when the addition ratio of the infrared light-based WB correction value is very largely changed. Therefore, the reference WB correction value is not registered unless the averaged infrared light amount is not smaller than the infrared light threshold value.

Then, the reference WB correction value-storing section 216 clears (initializes) the reference WB correction value, and sets a white pixel detection flag to false (step S1303). Here, the preceding reference WB correction value is inhibited from being taken over when the averaged infrared light amount becomes not smaller than the infrared light threshold value next time. Then, the CPU 103 proceeds to the step S314 in FIG. 3.

If the averaged infrared light amount is not smaller than the infrared light threshold value (YES to the step S1301), the WB correction value determination section 214 checks whether or not no reference WB correction value has been registered (step S1304). If no reference WB correction value has been registered (YES to the step S1304), i.e. if the averaged infrared light amount has become not smaller than the infrared light threshold value for the first time, the WB correction value determination section 214 determines whether or not the ratio-based reliability Tratio calculated in the step S601 is not lower than a predetermined white reliability threshold value (step S1305).

If the ratio-based reliability Tratio is lower than the predetermined white reliability threshold value (NO to the step S1305), the WB correction value-setting section 215 sets the mixed WB correction value calculated in the step S408 as the WB correction value to be applied to the image data (step S1306). Then, the reference WB correction value-storing section 216 registers the mixed WB correction value as the reference WB correction value, and sets the white pixel detection flag to false (step S1307). Then, the CPU 103 proceeds to the step S314 in FIG. 3.

If the ratio-based reliability Tratio is not lower than the predetermined white reliability threshold value (YES to the step S1305), the WB correction value-setting section 215 sets the mixed WB correction value calculated in the step S408 as the WB correction value to be applied to the image data (step S1308). Then, the reference WB correction value-storing section 216 registers the mixed WB correction value as the reference WB correction value, and sets the white pixel detection flag to true (step S1309). Then, the CPU 103 proceeds to the step S314 in FIG. 3.

The above-mentioned white pixel detection flag is used for taking over the WB correction value, in a case where the reliability of the mixed WB correction value is high and white pixels are obtained to a certain or larger extent.

If the reference WB correction value has been registered (NO to the step S1304), the WB correction value determination section 214 determines whether or not the ratio-based reliability Tratio calculated in the step S601 is not lower than the predetermined white reliability threshold value (step S1310).

If the ratio-based reliability Tratio is lower than the white reliability threshold value (NO to the step S1310), the WB correction value-setting section 215 sets the reference WB correction value as the WB correction value to be applied to the image data (step S1311). Then, the CPU 103 proceeds to the step S314 in FIG. 3.

If the ratio-based reliability Tratio is not lower than the white reliability threshold value (YES to the step S1310), the WB correction value determination section 214 determines whether or not white pixels were obtained when the WB correction value registered as the reference WB correction value was calculated. That is, in this step, the WB correction value determination section 214 determines whether or not the white pixel detection flag is true (step S1312).

If the white pixel detection flag is true (YES to the step S1312), the WB correction value-setting section 215 executes the step S1311. On the other hand, if the white pixel detection flag is false (NO to the step S1312), the WB correction value-setting section 215 sets the mixed WB correction value calculated in the step S408 as the WB correction value to be applied to the image data (step S1313).

Then, the reference WB correction value-storing section 216 registers the mixed WB correction value as the reference WB correction value, and sets the white pixel detection flag to true (step S1314). Then, the CPU 103 proceeds to the step S314 in FIG. 3.

As described above, if white pixels were not obtained when the reference WB correction value was calculated, the reference WB correction value is updated when white pixels are obtained in subsequent photographing. By thus changing the reference WB correction value, it eventually becomes possible to take over the WB correction value having a high reliability.

In the step S1312, the WB correction value determination section 214 may determine whether or not the reference WB correction value is higher in the ratio-based reliability Tratio associated therewith than the mixed WB correction value calculated in the step S408 is. Further, the WB correction value determination section 214 may determine whether or not a degree of influence of the infrared light-based WB correction value is high, by referring to the addition ratio Ratio_W_IR between the white-based WB correction value and the infrared light-based WB correction value, which is calculated in the step S1203.

Further, in the step S1303, the photographing time may be used as a condition for initializing the reference WB correction value. For example, when a predetermined time period elapses after a time at which an image associated with the reference WB correction value was photographed (i.e. the elapsed time is long enough to cause a large change in the inclination of the sun), the reference WB correction value is initialized. This inhibits the reference WB correction value from being taken over in a case where a change in the color temperature of light from the light source can be positively predicted.

Similarly, in the steps S1313 and S1314, the photographing time may be used as a condition for updating the reference WB correction value. In this case, if a difference between the color temperature associated with a WB correction value predicted based on the time at which photographing is performed this time, and the color temperature associated with the reference WB correction value, is not lower than a predetermined temperature, the WB control is performed using the mixed WB correction value. This inhibits the WB correction value from being taken over in a case where the photographing condition has been obviously changed.

As describe above, in the first embodiment of the present invention, in a case where the light source could be identified, even when the color of an object in an image photographed after identifying the light source has changed, the white balance control is performed using the WB correction value obtained when the light source was identified. This makes it possible to stably perform the white balance control in a manner less liable to be influenced by a change in the color of the object.

Next, a description will be given of a camera including an image processing device according to a second embodiment of the present invention.

The camera including the image processing device according to the second embodiment has the same configuration as that of the camera shown in FIG. 1, and the white balance controller included in the image processing device has the same configuration as shown in FIG. 2. Further, the photographing process performed by the camera including the image processing device according to the second embodiment is the same as the photographing process in FIG. 3 except the WB correction value calculation process. The second embodiment differs from the first embodiment in the WB correction value takeover process in the WB correction value calculation process in FIG. 4.

Figure 14A:
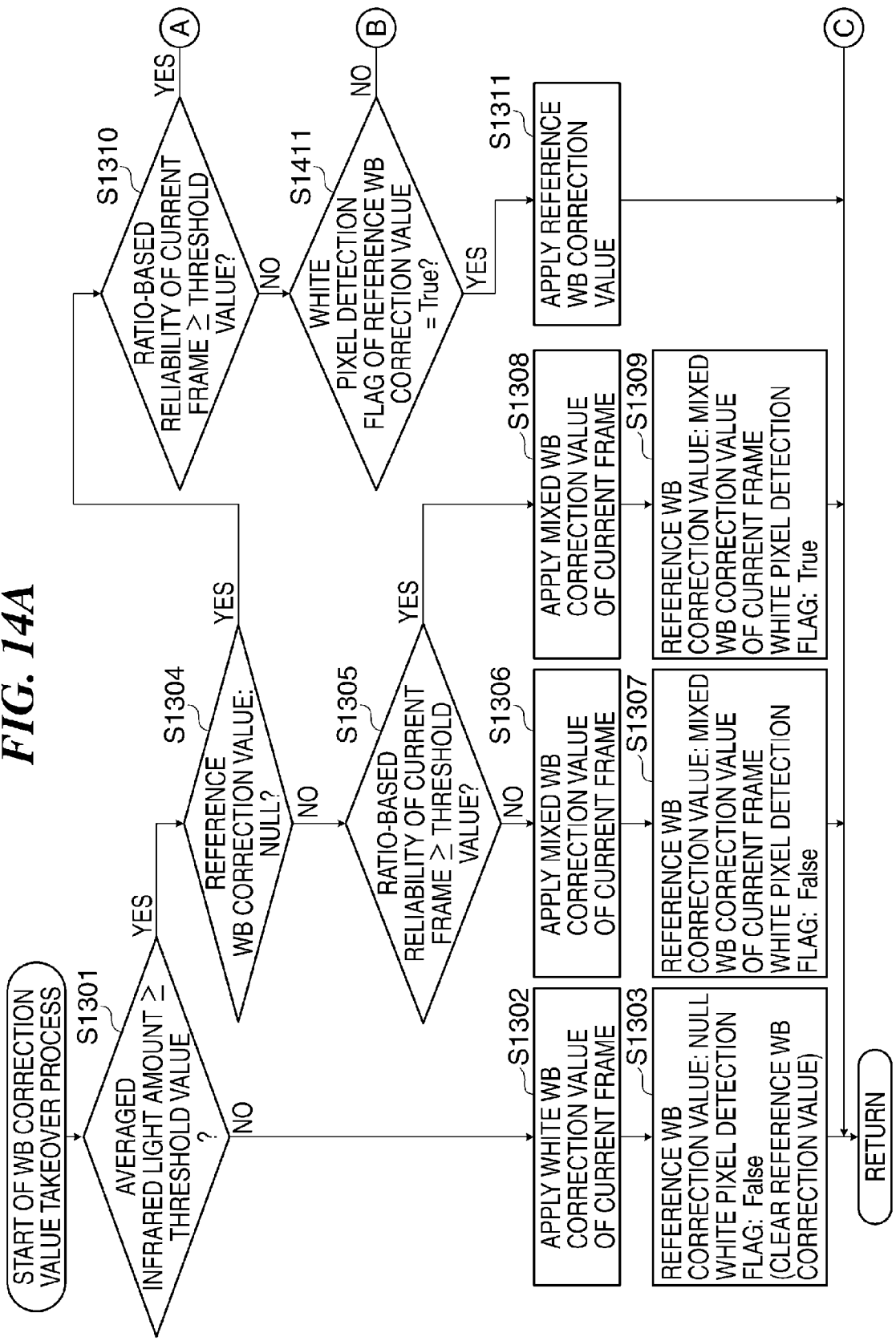
FIG. 14A is a flowchart of a takeover process performed by a digital camera including an image processing device according to a second embodiment of the present invention.
Figure 14B:
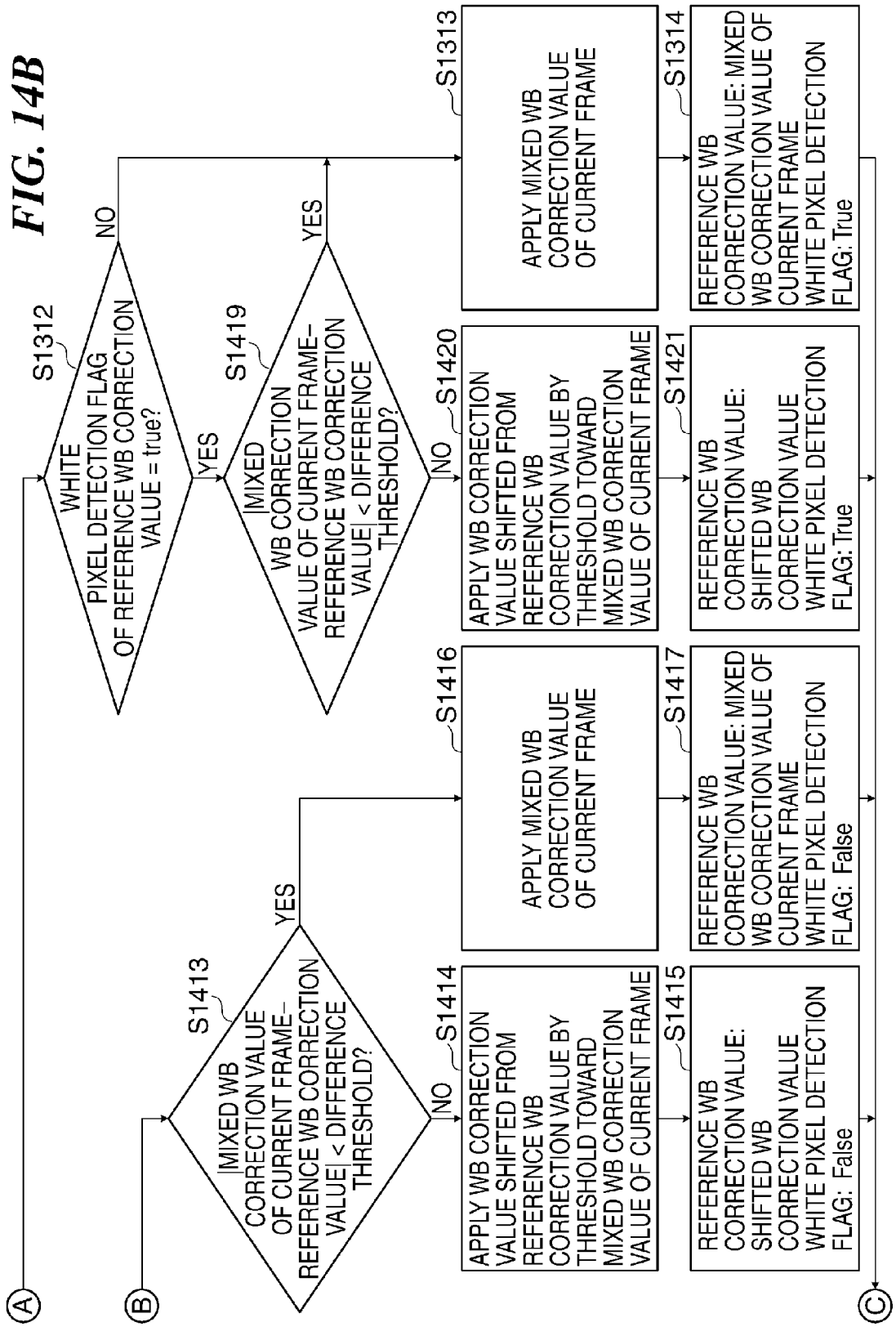
FIG. 14B is a continuation of FIG. 14A.

FIGS. 14A and 14B are a flowchart of the takeover process performed by the camera including the image processing device according to the second embodiment. In the takeover process in FIGS. 14A and 14B, the same steps as those of the takeover process in FIG. 13 are denoted by the same step numbers, and description thereof is omitted.

If it is determined in the step S1310 that the ratio-based reliability Tratio is lower than the white reliability threshold value (NO to the step S1310), the WB correction value determination section 214 determines whether or not white pixels (i.e. white blocks or a white frame) were obtained when the WB correction value registered as the reference WB correction value was calculated. That is, the WB correction value determination section 214 determines whether or not the white pixel detection flag is true (step S1411).

If the white pixel detection flag is true (YES to the step S1411), the CPU 103 proceeds to the step S1311, wherein the WB correction value-setting section 215 sets the reference WB correction value as the WB correction value to be applied to the image data. Then, the CPU 103 proceeds to the step S314 in FIG. 3.

If the white pixel detection flag is false (NO to the step S1411), the CPU 103 proceeds to a step S1413 in FIG. 14B, wherein the WB correction value determination section 214 calculates a difference between the mixed WB correction value and the reference WB correction value, and determines whether or not the calculated difference is smaller than a predetermined difference threshold value.

If the calculated difference is not smaller than the difference threshold value (NO to the step S1413), the WB correction value-setting section 215 sets a new reference WB correction value which is shifted from the reference WB correction value by a predetermined shift threshold value toward the mixed WB correction value, as the WB correction value to be applied to the image data (step S1414). Then, the reference WB correction value-storing section 216 registers the new reference WB correction value as the reference WB correction value, and sets the white pixel detection flag to false (step S1415). Then, the CPU 103 proceeds to the step S314 in FIG. 3.

If the calculated difference is smaller than the difference threshold value (YES to the step S1413), the WB correction value-setting section 215 sets the mixed WB correction value as the WB correction value to be applied to the image data (step S1416). Then, the reference WB correction value-storing section 216 registers the mixed WB correction value as the reference WB correction value, and sets the white pixel detection flag to false (step S1417). Then, the CPU 103 proceeds to the step S314 in FIG. 3.

If it is determined in the step S1312 that the white pixel detection flag is true (YES to the step S1312), the WB correction value determination section 214 calculates a difference between the mixed WB correction value and the reference WB correction value, and determines whether or not the calculated difference is smaller than the difference threshold value (step S1419).

If the calculated difference is not smaller than the difference threshold value (NO to the step S1419), the WB correction value-setting section 215 sets a new reference WB correction value (shifted white balance correction value) which is shifted from the reference WB correction value by a predetermined shift threshold value toward the mixed WB correction value as the WB correction value to be applied to the image data (step S1420). Then, the reference WB correction value-storing section 216 registers the new reference WB correction value as the reference WB correction value, and sets the white pixel detection flag to true (step S1421). Then, the CPU 103 proceeds to the step S314 in FIG. 3.

If the calculated difference is smaller than the difference threshold value (YES to the step S1419), the CPU 103 proceeds, similarly to the takeover process in FIG. 13, to the step S1313.

Figure 15:
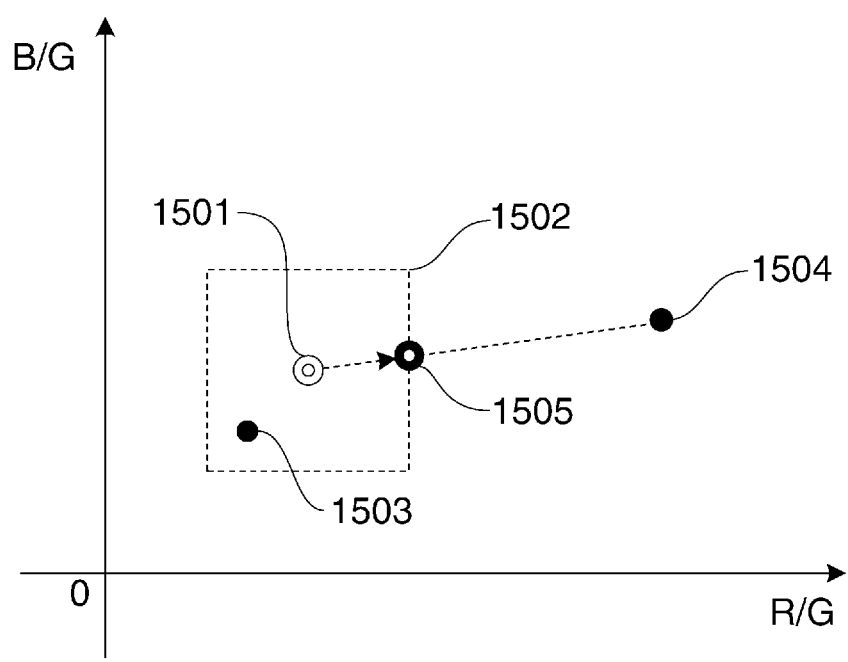
FIG. 15 is a diagram useful in explaining processing performed in the takeover process in FIGS. 14A and 14B, according to a result of determination of a difference between a mixed WB correction value and a reference WB correction value, and a difference threshold value.

FIG. 15 is a diagram useful in explaining processing performed in the takeover process in FIGS. 14A and 14B, according to a result of determination of the difference between the mixed WB correction value and the reference WB correction value, and the difference threshold value.

Referring to FIG. 15, the horizontal axis represents the ratio R/G, and the vertical axis represents the ratio B/G. Further, the reference WB correction value is denoted by reference numeral 1501, and a range of the difference threshold value having the reference WB correction value 1501 as the center is denoted by reference numeral 1502. Further, in this example, a first mixed WB correction value 1503 and a second mixed WB correction value 1504 are indicated as the mixed WB correction values, and a reference WB correction value which is shifted from the reference WB correction value 1501 by a predetermined shift threshold value toward the second mixed WB correction value 1504 is denoted by reference numeral 1505.

Now, assuming that the first mixed WB correction value 1503 appearing in FIG. 15 has been obtained, the first mixed WB correction value 1503 is included in the difference threshold value range 1502 having the reference WB correction value 1501 as the center. Therefore, in this example, the first mixed WB correction value 1503 is set as the WB correction value to be applied to the image data.

On the other hand, assuming that the second mixed WB correction value 1504 has been obtained, the second mixed WB correction value 1504 is not included in the difference threshold value range 1502 having the reference WB correction value 1501 as the center. Therefore, in this case, the reference WB correction value 1505 corresponding to a point at which a straight line connecting the reference WB correction value 1501 and the second mixed WB correction value 1504 intersects a boundary of the difference threshold value range 1502 is set as the WB correction value to be applied to the image data.

Note that the difference threshold value range 1502 having the reference WB correction value 1501 as the center is set, for example, to such a range in which a change in the WB correction value is insignificant.

As described above, in the second embodiment of the present invention, the reference WB correction value is not simply taken over, but the reference WB correction value is taken over by considering the WB correction value calculated according to image data obtained through photographing. This makes it possible to leave atmosphere to be realized by the white balance control using the WB correction value calculated according to image data obtained through photographing. Further, the degree of influence of the reference WB correction value is controlled by combining the same with the white pixel detection flag, and hence it is possible to properly perform the white balance control.

As is clear from the above description, in the example shown in FIGS. 1 and 2, the CPU 103, the block dividing section 201, the color determination section 205, the luminance determination section 206, the infrared light amount determination section 207, the RGB value addition section 208, the light source color estimation section 209, and the infrared light-based WB correction value calculation section 210 function as a first calculation unit. Further, the CPU 103, the block dividing section 201, the white determination section 202, and the white-based WB correction value calculation section 203 function as a second calculation unit.

Further, the CPU 103, the white-based WB correction value reliability calculation section 204, the infrared light-based WB correction value reliability calculation section 211, the WB correction value addition ratio calculation section 212, and the mixed WB correction value calculation section 213 function as a third calculation unit. Further, the primary storage device 104 functions as a storage unit, and the CPU 103 and the WB correction value determination section 214 function as a control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-139610 filed Jul. 7, 2014, which is hereby incorporated by reference herein in its entirety.

What is claimed is:

1. An image processing device that performs white balance processing, comprising:
   a first calculation unit configured to calculate a first white balance correction value for performing white balance processing, according to an amount of infrared light obtained from a first image;
   a second calculation unit configured to calculate a second white balance correction value which is different from the first white balance correction value, according to white pixels obtained from the first image;
   a third calculation unit configured to calculate a third white balance correction value based on the first white balance correction value and the second white balance correction value;
   a white balance control unit configured to perform white balance processing on the first image using the third white balance correction value; and
   a storage unit configured to store the third white balance correction value as a reference white balance correction value,
   wherein when performing white balance processing on a second image which is obtained through photographing performed later than photographing the first image, said white balance control unit performs, in a case where an amount of infrared light not smaller than a predetermined amount is obtained from the second image, and also the number of obtained white pixels in the second image is smaller than a predetermined number, white balance processing on the second image using the reference white balance correction value stored in said storage unit.

2. The image processing device according to claim 1, wherein when the amount of infrared light not smaller than the predetermined amount is obtained from the second image and also the number of white pixels in the second image is not smaller than the predetermined number, said white balance control unit updates the reference white balance correction value stored in said storage unit with the third white balance correction value calculated using the second image.

3. The image processing device according to claim 1, wherein when the amount of infrared light not smaller than the predetermined amount is not detected from the second image, said white balance control unit initializes the reference white balance correction value stored in said storage unit.

4. The image processing device according to claim 1, wherein when the white pixels in the second image are more than the white pixels in an image used for calculation of the reference white balance correction value stored in said storage unit, said white balance control unit performs white balance processing using the third white balance correction value calculated using the second image, and updates the reference white balance correction value stored in said storage unit with the third white balance correction value calculated using the second image.

5. The image processing device according to claim 1, wherein when the white pixels in the second image are less than the white pixels in an image used for calculation of the reference white balance correction value stored in said storage unit, said white balance control unit performs white balance processing using the reference white balance correction value stored in said storage unit.

6. The image processing device according to claim 1, wherein when a difference between the third white balance correction value calculated using the second image and the reference white balance correction value stored in said storage unit is not smaller than a predetermined difference threshold value, said white balance control unit performs white balance processing using a shifted white balance correction value obtained by shifting the reference white balance correction value stored in said storage unit by a predetermined shift threshold value toward the third white balance correction value calculated using the second image, and updates the reference white balance correction value stored in said storage unit with the shifted white balance correction value.

7. The image processing device according to claim 1, wherein when a difference between the third white balance correction value calculated using the second image and the reference white balance correction value stored in said storage unit is smaller than the predetermined difference threshold value, said white balance control unit performs white balance processing using the third white balance correction value calculated using the second image, and updates the reference white balance correction value stored in said storage unit with the third white balance correction value calculated using the second image.

8. The image processing device according to claim 1, wherein when a predetermined time period elapses after a time at which the first image was obtained, said white balance control unit initializes the reference white balance correction value stored in said storage unit.

9. The image processing device according to claim 1, wherein when a difference between a color temperature of light from a light source in the second image and a color temperature of light from a light source in an image from which the reference white balance correction value stored in said storage unit is calculated is not smaller than a predetermined temperature, said white balance control unit performs white balance processing using the third white balance correction value calculated using the second image, and updates the reference white balance correction value stored in said storage unit with the third white balance correction value calculated using the second image.

10. An image pickup apparatus comprising:
an image pickup device;
an infrared light sensor that detects infrared light;
an acquisition unit configured to acquire a color evaluation value from a first image obtained through photographing performed using said image pickup device;
a calculation unit configured to calculate a white balance correction value using a result of detection of an amount of infrared light when photographing the first image and the color evaluation value acquired from the first image;
an image processing unit configured to perform white balance correction processing on the first image using the white balance correction value; and
a storage unit configured to store the white balance correction value used for the white balance correction processing,
wherein when performing white balance processing on a second image which is obtained through photographing performed later than photographing the first image, said image processing unit determines, using the result of detection of the amount of infrared light when photographing the second image, whether or not to take over the reference white balance correction value stored in said storage unit, and then performs white balance processing on the second image.

11. The image pickup apparatus according to claim 10, wherein said acquisition unit acquires a color evaluation value from each area obtained by dividing the first image into a plurality of area, and
wherein said calculation unit determines, based on an amount of infrared light detected from each area, whether or not the color of the area is a color of an object, and calculates the white balance correction value from color evaluation values of areas the color of which is determined to be the color of the object.

12. A method of controlling an image processing device that performs white balance processing and includes a storage unit, comprising:
calculating a first white balance correction value for performing white balance processing, according to an amount of infrared light obtained from a first image;
calculating a second white balance correction value which is different from the first white balance correction value, according to white pixels obtained from the first image;
calculating a third white balance correction value based on the first white balance correction value and the second white balance correction value;
performing white balance processing on the first image using the third white balance correction value;
storing the third white balance correction value in the storage unit as a reference white balance correction value; and
when performing white balance processing on a second image which is obtained through photographing performed later than photographing the first image, performing, in a case where an amount of infrared light not smaller than a predetermined amount is obtained from the second image, and also the number of obtained white pixels in the second image is smaller than a predetermined number, white balance processing on the second image using the reference white balance correction value stored in the storage unit.

* * * * *